United States Patent
Baldwin

(10) Patent No.: US 11,563,876 B1
(45) Date of Patent: Jan. 24, 2023

(54) ELECTRICAL WALL PLATE WITH MOVABLY POSITIONABLE CAMERA

(71) Applicant: Jeffrey P. Baldwin, Anthem, AZ (US)

(72) Inventor: Jeffrey P. Baldwin, Anthem, AZ (US)

(*) Notice: Subject to any disclaimer, the term of this patent is extended or adjusted under 35 U.S.C. 154(b) by 201 days.

(21) Appl. No.: 16/856,793

(22) Filed: Apr. 23, 2020

Related U.S. Application Data

(63) Continuation-in-part of application No. 16/351,442, filed on Mar. 12, 2019, now Pat. No. 11,277,587.

(60) Provisional application No. 62/641,474, filed on Mar. 12, 2018, provisional application No. 62/837,643, filed on Apr. 23, 2019.

(51) Int. Cl.
| | |
|---|---|
| *H04N 5/225* | (2006.01) |
| *H02G 3/14* | (2006.01) |
| *H04N 5/232* | (2006.01) |
| *H01R 13/639* | (2006.01) |
| *H01R 25/00* | (2006.01) |
| *H01H 9/02* | (2006.01) |

(52) U.S. Cl.
CPC ............ *H04N 5/2257* (2013.01); *H02G 3/14* (2013.01); *H04N 5/23299* (2018.08); *H01H 9/0271* (2013.01); *H01R 13/6395* (2013.01); *H01R 25/006* (2013.01)

(58) Field of Classification Search
CPC .... H04N 5/2257; H04N 5/23299; H02G 3/14; H01H 9/0271; H01R 13/6395; H01R 25/006
See application file for complete search history.

(56) References Cited

U.S. PATENT DOCUMENTS

| | | | | |
|---|---|---|---|---|
| 6,056,450 A | * | 5/2000 | Walling | F16M 11/42 |
| | | | | 396/428 |
| 6,697,117 B1 | * | 2/2004 | Park | H04M 1/0218 |
| | | | | 348/E5.026 |

(Continued)

FOREIGN PATENT DOCUMENTS

| | | | | |
|---|---|---|---|---|
| EP | 3104350 A1 | * | 12/2016 | ....... G08B 13/19619 |
| KR | 20100012881 | * | 12/2010 | ....... G08B 13/19619 |

OTHER PUBLICATIONS

AES System Cameras Date First Available Jul. 25, 2016 (Year: 2016) 7 pages.

(Continued)

*Primary Examiner* — Joseph Suh
(74) *Attorney, Agent, or Firm* — Booth Udall Fuller, PLC; Kenneth C. Booth

(57) ABSTRACT

An electrical wall plate may include one or more of the following features. A face plate comprising at least one electrical device opening extending through the face plate. At least one box mounting screw opening configured to receive at least one box mounting screw to fasten the face plate to an electrical device. A power connector extending in a direction away from the face plate and configured to connect with the electrical device. A camera integrated with the face plate and in electrical connection with the power connector and configured to operate by power obtained from the electrical device when the power connector is connected to the electrical device. A camera movement control feature may comprise externally-engageable components coupled to the face plate and configured to movably position the camera or a camera lens by pan or tilt to point in different directions.

18 Claims, 21 Drawing Sheets

(56) References Cited

U.S. PATENT DOCUMENTS

| | | | | |
|---|---|---|---|---|
| 6,752,541 | B1* | 6/2004 | Dykyj | B66F 11/048 |
| | | | | 248/176.1 |
| 9,113,051 | B1 | 8/2015 | Scalisi | |
| 9,769,420 | B1* | 9/2017 | Moses | H04L 12/282 |
| 10,505,326 | B2* | 12/2019 | Chien | H01R 13/7175 |
| 10,642,231 | B1* | 5/2020 | Billings | G06N 3/08 |
| 10,796,798 | B1* | 10/2020 | Stone | G16H 50/20 |
| 2003/0201371 | A1* | 10/2003 | Zadok | B65D 83/525 |
| | | | | 248/276.1 |
| 2008/0088703 | A1* | 4/2008 | Dollahite | G01S 3/7864 |
| | | | | 348/169 |
| 2010/0118162 | A1* | 5/2010 | Saijo | H04N 5/23203 |
| | | | | 348/231.6 |
| 2014/0162777 | A1* | 6/2014 | Hsu | A63F 13/837 |
| | | | | 463/31 |
| 2015/0189226 | A1* | 7/2015 | Gravina | H04L 65/65 |
| | | | | 348/14.02 |
| 2015/0340826 | A1* | 11/2015 | Chien | H01R 13/73 |
| | | | | 439/490 |
| 2016/0277679 | A1* | 9/2016 | Kimura | H04N 5/23216 |
| 2017/0041530 | A1* | 2/2017 | Kimura | H04N 5/23216 |
| 2017/0223109 | A1* | 8/2017 | Shoemake | H04W 76/10 |
| 2019/0219899 | A1* | 7/2019 | Vega | G03B 17/02 |
| 2020/0196141 | A1* | 6/2020 | Baker | H04R 1/08 |
| 2020/0216025 | A1* | 7/2020 | Le Bourgeois | B60R 25/241 |

OTHER PUBLICATIONS

Office Action dated Oct. 6, 2022 for U.S. Appl. No. 17/138,792 (pp. 1-11).

* cited by examiner

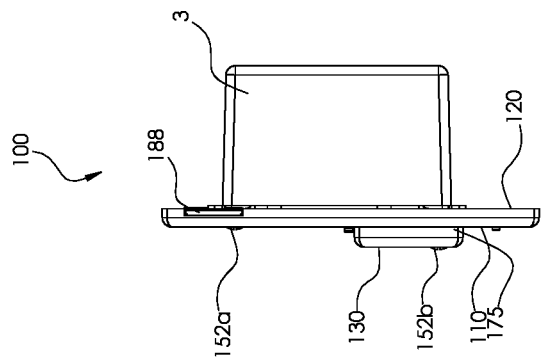
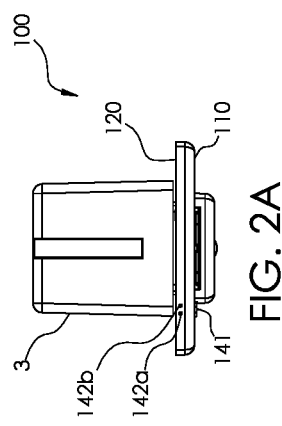
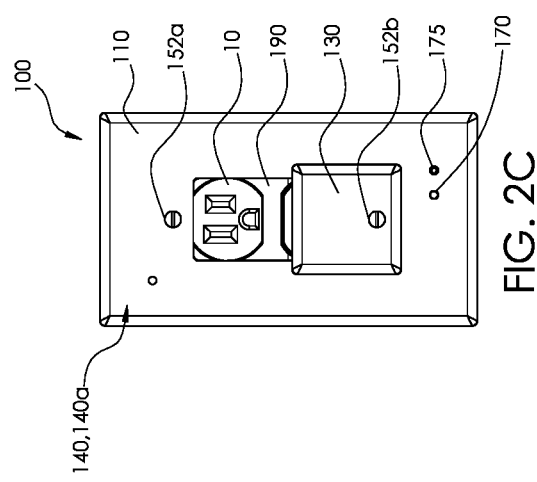
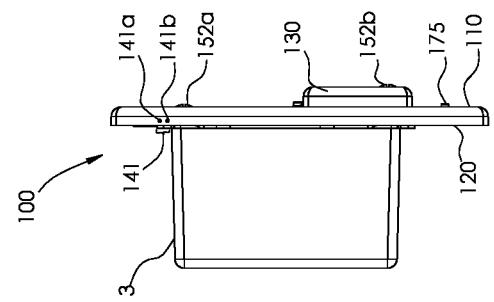

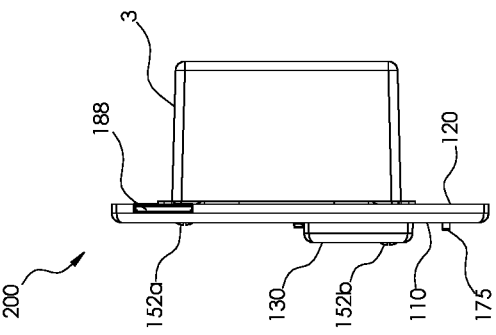
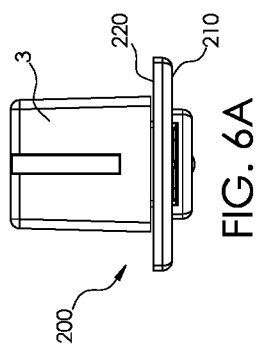
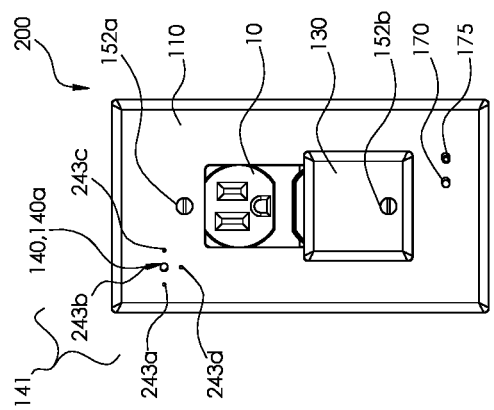

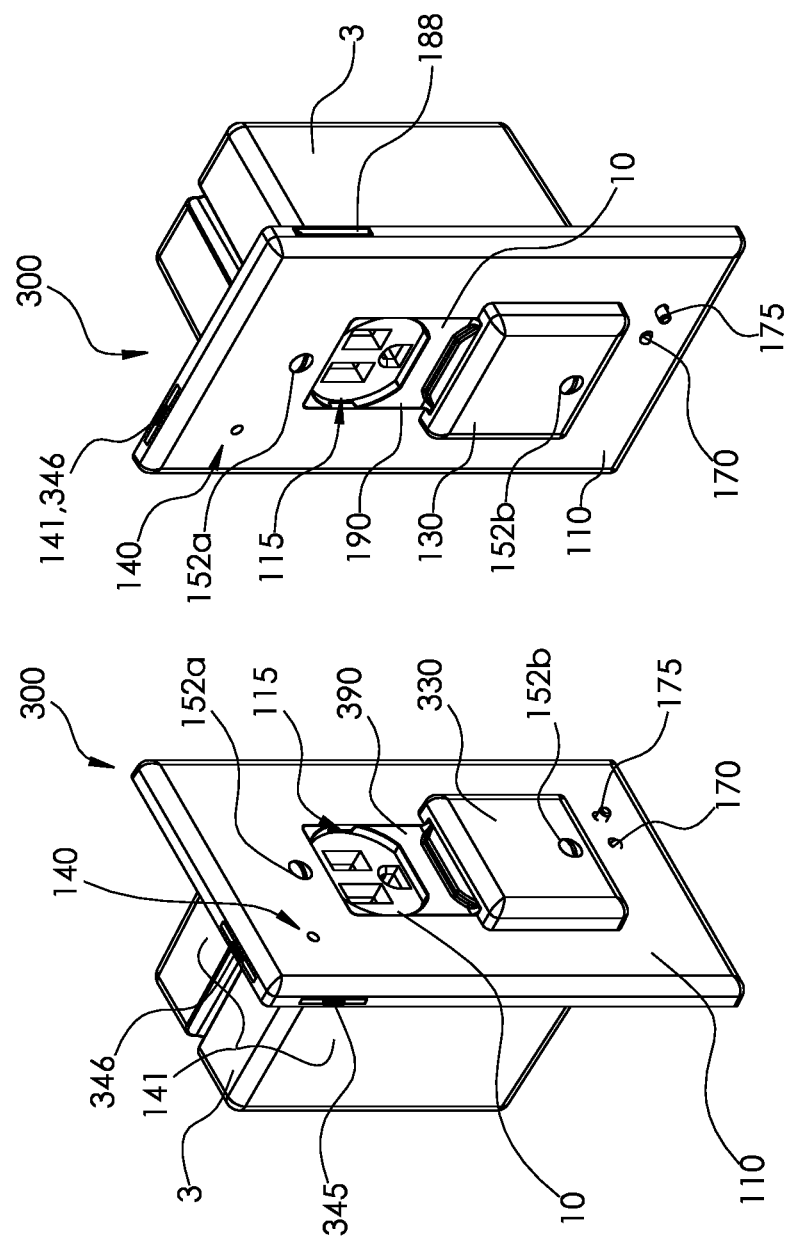

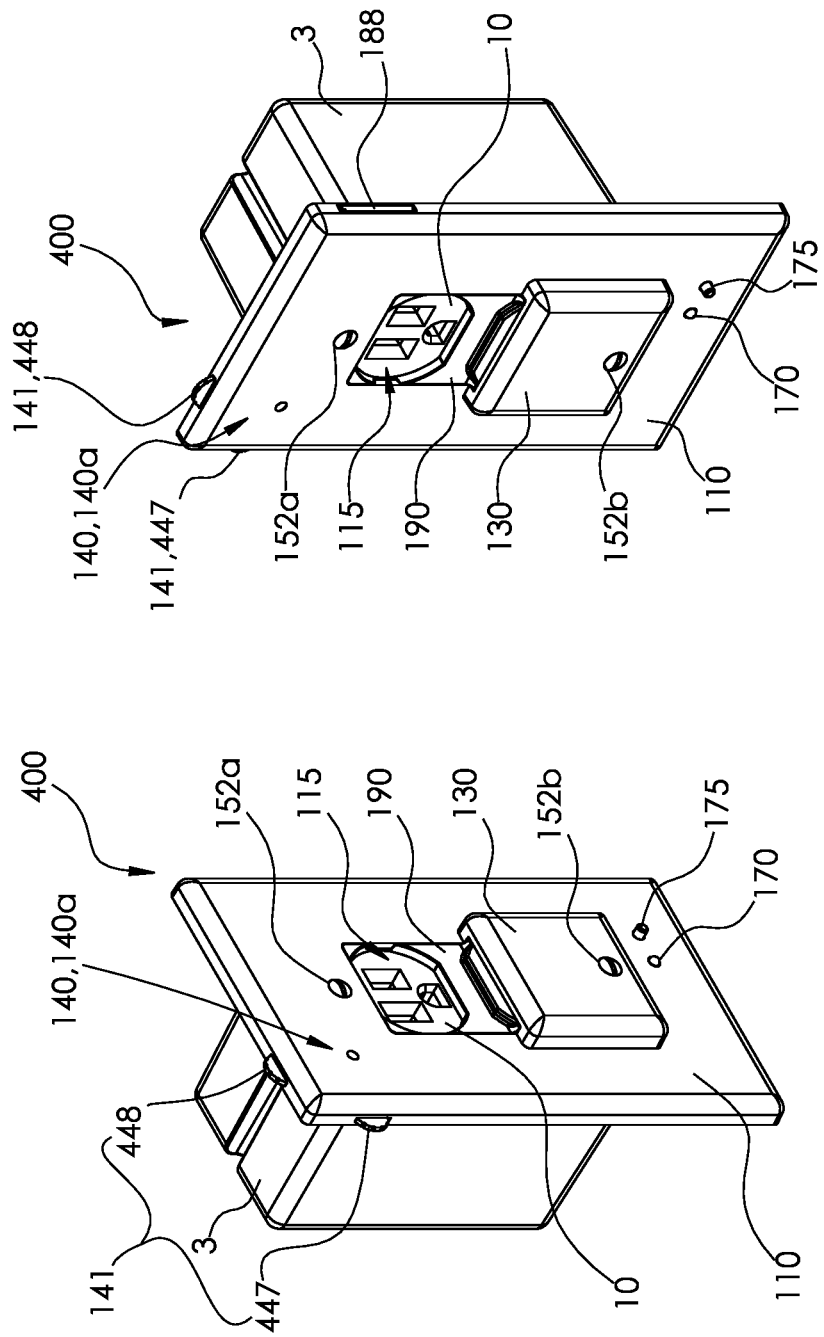

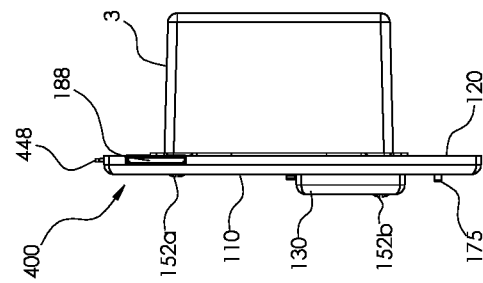
FIG. 12A
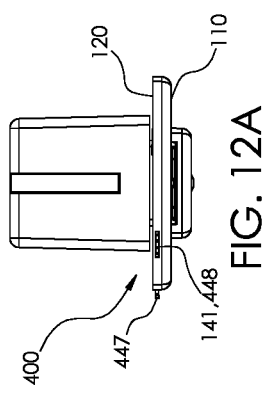
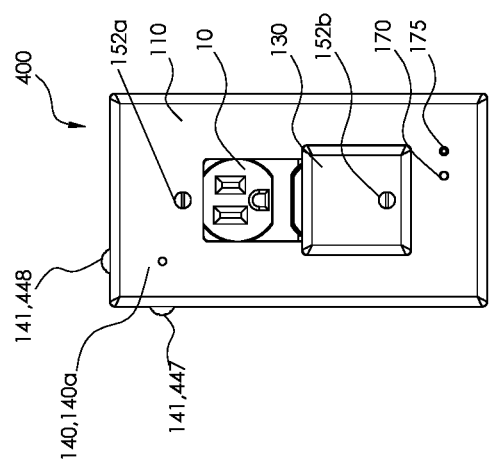
FIG. 12C
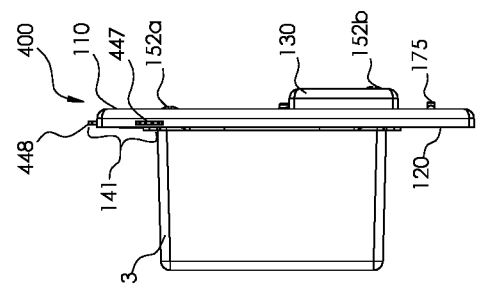
FIG. 12B
FIG. 12D

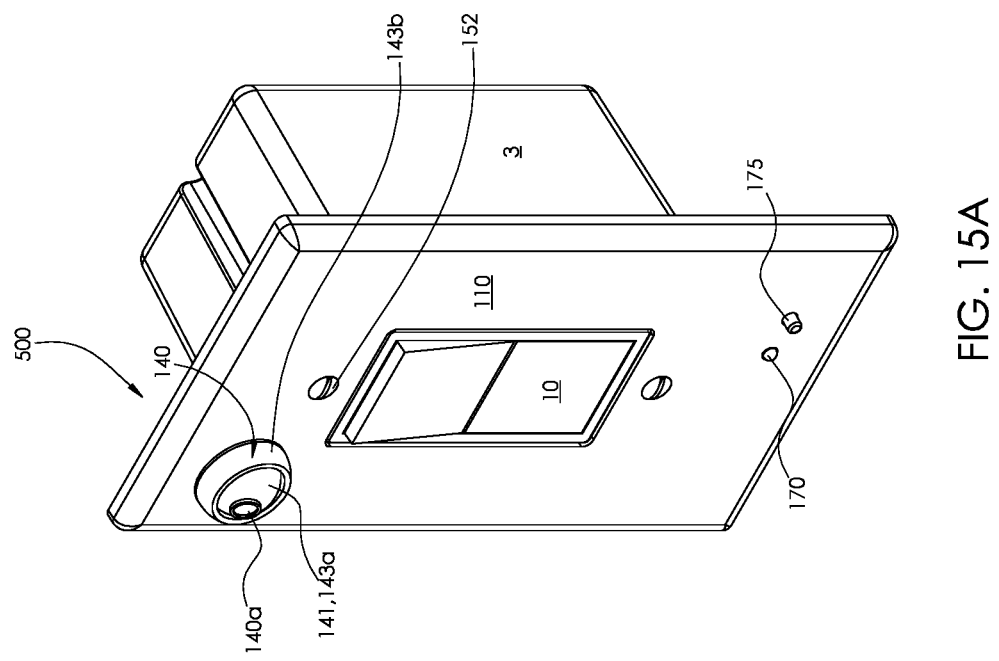

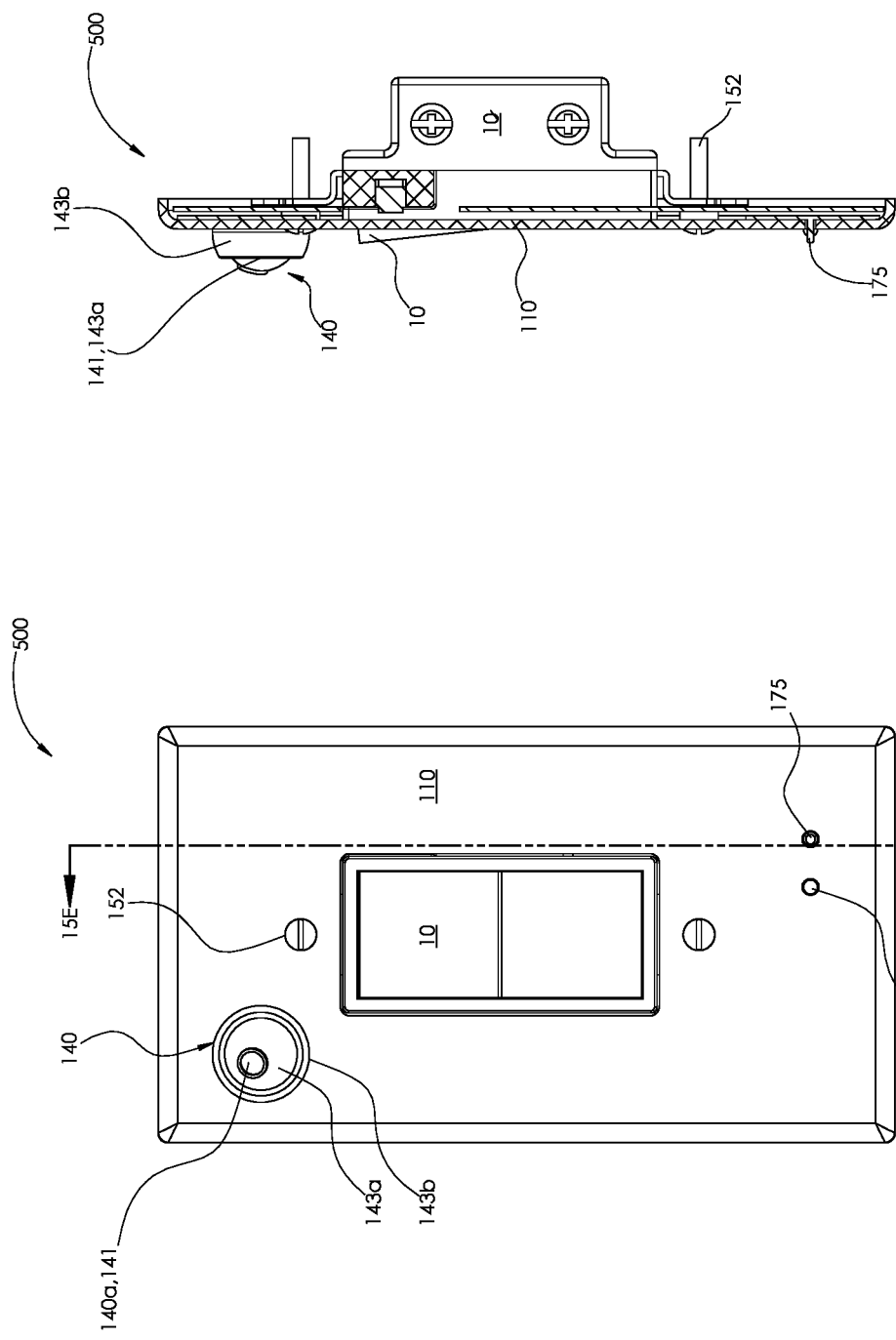

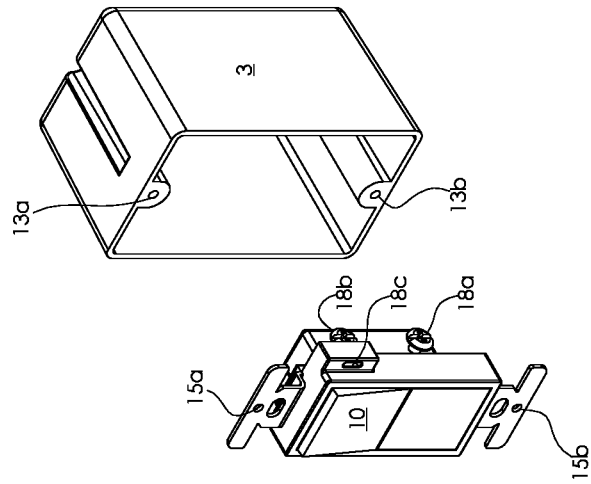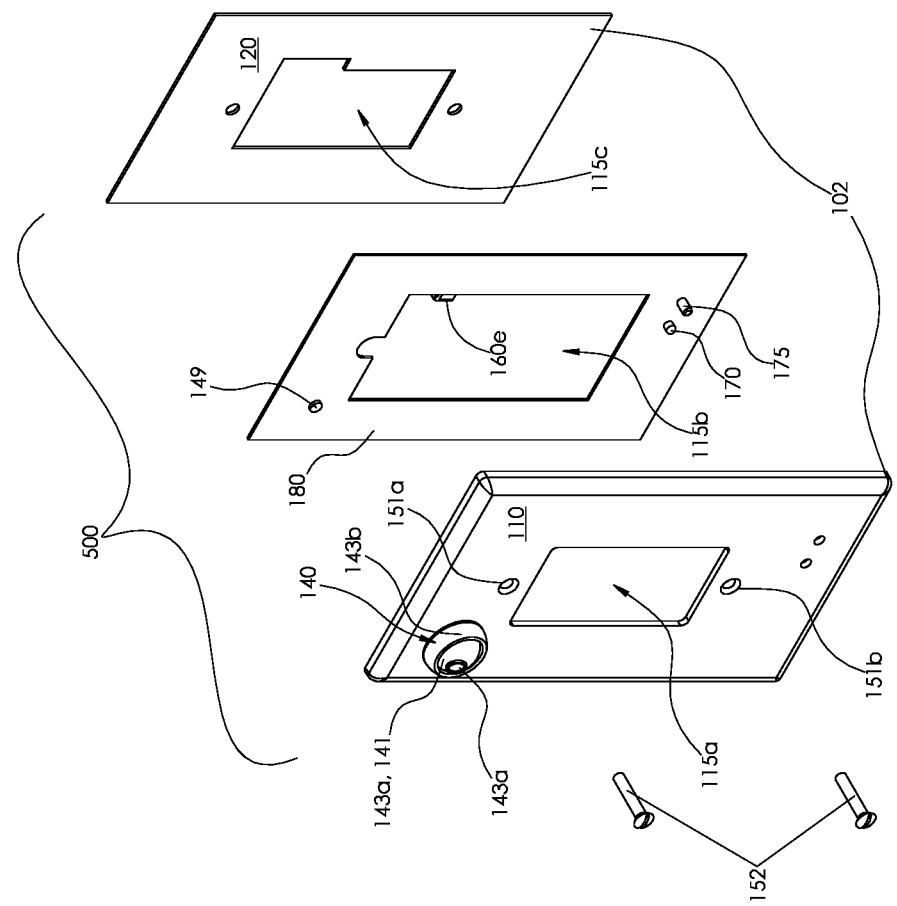
FIG. 18B

ELECTRICAL WALL PLATE WITH MOVABLY POSITIONABLE CAMERA

CLAIM OF PRIORITY

This application is a continuation-in-part of patent application Ser. No. 16/351,442 to Jeffrey P. Baldwin et al., titled "Electrical Wall Plate" filed Mar. 12, 2019, which application claims the benefit, including the filing date, of provisional patent application No. 62/641,474 to Jeffrey P. Baldwin et al., titled "Electrical Wall Plate" filed Mar. 12, 2018, the entirety of the disclosures of which are incorporated herein by this reference. This application also claims the benefit, including the filing date, of provisional patent application No. 62/837,643 to Jeffrey P. Baldwin titled "Electrical Wall Plate with Moveably Positionable Camera" filed Apr. 23, 2019, the entirety of the disclosure of which is incorporated herein by this reference.

TECHNICAL FIELD

The disclosure relates generally to electrical wall plates and, more particularly, to electrical wall plates having a movably positionable camera.

BACKGROUND

An electrical wall plate is a typical device used to prevent access to electrical wires and electrical receptacles therein. Conventional electrical wall plates commonly mount to electrical receptacles via connection by fasteners, such as screws, or by a mechanical fit involving interlocking components designed to secure the wall plate to the receptacle. Recently, some electrical wall plates have incorporated lights or other electronic components, thereby offering additional functionality beyond mere prevention of access to the electrical wires and receptacle. However, such electrical wall plate designs suffer from one or more of cumbersome and unsafe wiring arrangements, bulky design geometries, and infective communication abilities.

SUMMARY

A need exists for an electrical wall plate that securely mounts to an electrical receptacle, incorporates convenient power connection, includes an efficient design geometry integrating one or more electronic components, such as a movably positionable camera, and affords effective communication ability.

According to an aspect of the disclosure an electrical wall plate may comprise at least one electrical outlet face plate comprising at least one electrical device opening extending through the face plate, wherein the at least one electrical device opening is configured to permit first male electrical plug blades of an electrical power plug to extend through the electrical device opening and engage with a first female receiver of the electrical device, and the at least one face plate comprises a front face plate and a rear face plate, at least one box mounting screw opening configured to receive at least one box mounting screw to fasten the face plate to an electrical device, a power connector comprising second male electrical plug blades extending in a direction away from the face plate and configured to connect with a second female receiver of the electrical device, a camera integrated within the face plate and in electrical connection with the power connector and configured to operate by power obtained from the electrical device when the power connector is connected to the power transmission conductor of the electrical device, and a camera movement control feature comprising externally-engageable components disposed on a side or on a front surface of the face plate and configured to movably position the camera or a camera lens by pan or tilt to point in different directions by directly applied mechanical force or indirectly through an electrical signal to servo motors.

Particular embodiments may comprise one or more of the following features. The camera movement control feature may be positioned in at least one pin-hole or aperture. The camera movement control feature may comprise at least one slider mechanism. The camera movement control feature may comprise at least one dial mechanism. The camera or camera lens may include a zoom functionality configured to modify the range of the field of view. A printed circuit board (PCB) disposed between the front face plate and the rear face plate, the PCB in electrical communication with the camera and the power connector. A memory storage configured to store photographs or video images captured by the camera. A transmitter configured to transmit signals corresponding to video or photo images captured by the camera to a wireless local area network (WLAN) receiver or a wireless personal area network (WPAN) receiver. An external memory port on the electrical wall plate configured to receive and communicate with a removable external memory device.

According to an aspect of the disclosure, an electrical wall plate may comprise a face plate comprising at least one electrical device opening extending through the face plate, at least one box mounting screw opening configured to receive at least one box mounting screw to fasten the face plate to an electrical device, a power connector extending in a direction away from the face plate and configured to connect with the electrical device, a camera integrated with the face plate and in electrical connection with the power connector and configured to operate by power obtained from the electrical device when the power connector is connected to the electrical device, and a camera movement control feature comprising externally-engageable components coupled to the face plate and configured to movably position the camera or a camera lens by pan or tilt to point in different directions.

Particular embodiments may comprise one or more of the following features. The camera movement control feature may be positioned in at least one pin-hole or aperture disposed on a side or on a front surface of the face plate. The camera movement control feature may comprise at least one slider mechanism disposed on a side or on a front surface of the face plate. The camera movement control feature may comprise at least one dial mechanism disposed on a side or on a front surface of the face plate. The camera movement control feature may comprise a ball and socket joint. The power connector may comprise male electrical plug blades, direct wiring, spring tabs, or a universal serial bus (USB) connector. An external memory port on the electrical wall plate configured to receive and communicate with a removable external memory device.

According to an aspect of the disclosure, a method of capturing video images from an electrical wall plate may comprise providing an electrical wall plate having at least one opening extending through the electrical wall plate, wherein the electrical wall plate further includes a power connector, a printed circuit board in electrical connection with the power connector, and a video camera integrated within the electrical wall plate and in electrical connection with the printed circuit board, movably positioning the camera with a camera movement control feature to point the camera in a desired direction, powering the camera with electricity obtained through an electrical connection between the power connector and an electrical device, and capturing video images by the camera.

Particular embodiments may comprise one or more of the following features. Storing the captured video images in a memory storage device electrically connected to the printed circuit board of the electrical wall plate. Transmitting the video images via a transmitter electrically connected to the printed circuit board of the electrical wall plate, wherein the transmitter transmits signals to a wireless local area network (WLAN) receiver or a wireless personal area network (WPAN) receiver. A button switch on the electrical wall plate configured to facilitate pairing of the transmitter with a wireless receiver. An electrical receptacle or a light switch. The power connector may comprise male electrical plug blades, direct wiring, spring tabs, or a universal serial bus (USB) connector.

Aspects and applications of the disclosure presented here are described below in the drawings and detailed description. Unless specifically noted, the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function The foregoing and other features, advantages and construction of the present disclosure will become more readily apparent and fully appreciated from the following more DETAILED DESCRIPTION of the particular embodiments and in conjunction with the accompanying DRAWINGS.

BRIEF DESCRIPTION OF THE DRAWINGS

To further clarify the above and other advantages and features of the present disclosure, some of the embodiments will be described in detail, with reference to the following figures, wherein like designations denote like members. It is appreciated that these figures depict only illustrated embodiments pertinent to the present disclosure and are therefore not to be considered limiting of inventive scope. As such, the present disclosure will be set forth and explained with additional specificity and detail through the use of the accompanying drawings in which:

FIG. 2A illustrates a top view of the electrical wall plate of FIGS. 1A and 1B;

FIG. 2B illustrates a left side view of the electrical wall plate of FIGS. 1A and 1B;

FIG. 2C illustrates a front view of the electrical wall plate of FIGS. 1A and 1B;

FIG. 2D illustrates a right side view of the electrical wall plate of FIGS. 1A and 1B;

FIG. 6A illustrates a top view of the electrical wall plate of FIG. 4;

FIG. 6B illustrates a left side view of the electrical wall plate of FIG. 4;

FIG. 6C illustrates a front view of the electrical wall plate of FIG. 4;

FIG. 6D illustrates a right side view of the electrical wall plate of FIG. 4;

FIG. 8A illustrates a left perspective view of another embodiment of an electrical wall plate comprising an integral electronic component or camera;

FIG. 8B illustrates a right perspective view of another embodiment of an electrical wall plate comprising an integral electronic component or camera;

FIG. 11A illustrates a left perspective view of another embodiment of an electrical wall plate comprising an integral electronic component or camera;

FIG. 11B illustrates a right perspective view of another embodiment of an electrical wall plate comprising an integral electronic component or camera;

FIG. 12A illustrates a top view of the electrical wall plate of FIGS. 11A and 11B;

FIG. 12B illustrates a left side view of the electrical wall plate of FIGS. 11A and 11B;

FIG. 12C illustrates a front view of the electrical wall plate of FIGS. 11A and 11B;

FIG. 12D illustrates a right side view of the electrical wall plate of FIGS. 11A and 11B;

FIGS. 15A-15E illustrate various views of an embodiment of an electrical wall plate comprising an integral electronic component or camera;

FIGS. 18A and 18B illustrate a rear and front exploded perspective views of an embodiment of an electrical wall plate comprising universal serial bus (USB) or low voltage connector for a power connector.

DETAILED DESCRIPTION

Figure 1B:
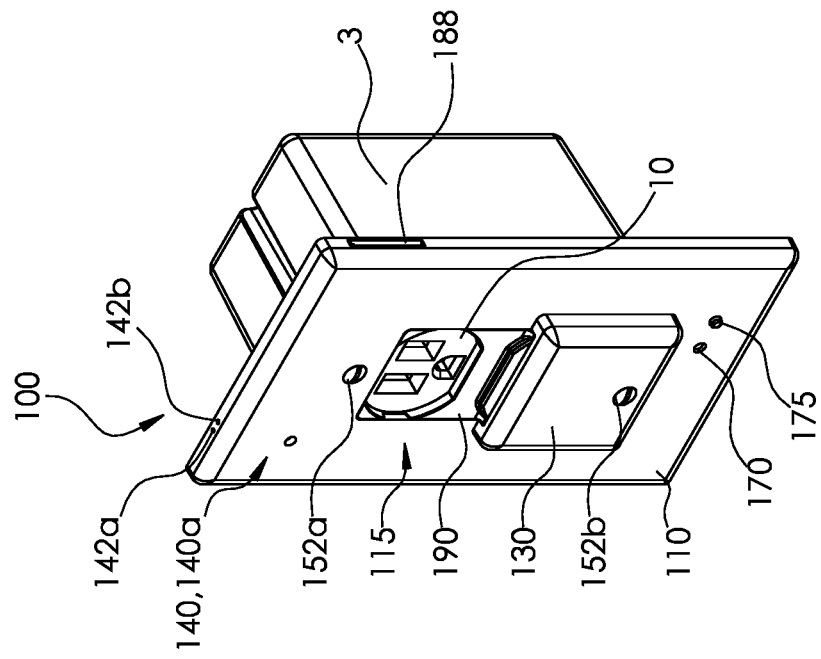
FIG. 1B illustrates a front right perspective view of an embodiment of an electrical wall plate comprising an integral electronic component or camera.

A detailed description of the hereinafter described embodiments of the disclosed apparatuses, systems and methods are presented herein by way of exemplification and not limitation with reference to the Figures listed above. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

Attempts have been made to provide an electrical wall plate including integrated electronic components, but those attempts have been structurally cumbersome, functionally inefficient and cost prohibitive. Referring to the drawings, FIGS. 1A and 1B, respectively, depict left and right perspective views of an embodiment of an electrical wall plate 100 comprising an integral electronic component, such as a camera 140, that solves the aforementioned problems. As depicted, the electrical wall plate 100 may include a front plate face 110. An electronic device opening 115 may extend through the front plate face 110 of the electrical wall plate 100. In addition, the electrical wall plate may include a housing 130. The housing 130 may house electronic components, such as an electrical power transformer, a transmitter, such as an antenna, a printed circuit board, a memory storage component, a battery, a microphone, a speaker, a sensor or multiple sensors, such as a smoke detector or a carbon monoxide detector, a communications port for connecting an external electronic device, a fragrance storage and release element, and/or a mechanical element such as a motor or a structural feature configured to movably extend from the housing 130, and/or other like components.

Embodiments of an electrical wall plate 100 may include an integral electronic component, such as a camera 140. Embodiments of the camera 140 may be configured to be movable so that the camera 140 and/or a lens 140a of the camera 140 may be positioned to point in different directions. Moreover, the camera 140 may include a lens having pan, tilt and zoom functionality, wherein the pan, tilt and zoom functionality may be facilitated by motors, servos, magnets, fluidic pressure devices, heated elements, pneumatic elements, mechanical movement components configured to be engaged and operated by a user, or other features or combinations thereof facilitating movement of the camera 140 and/or the lens of the camera 140. One or more box mounting screws 152a and 152b, may extend through the electrical wall plate 100 and be positioned on the electrical wall plate 100 so as to correspond to similar openings or mechanical features of an electrical device 10, such as a light switch or and electrical receptacle, or socket fixture. The box mounting screws 152a and 152b may facilitate mounting of the electrical wall plate 100 to the electrical device 10 and also to an electrical box 3. Depending on the type of electrical device 10 to which the electrical wall plate 100 is mounted, an adapter 190 may be included to facilitate structural correspondence with the electrical device. For example, the adapter 190 may be shaped create an electrical device opening 115 having a shape corresponding with the geometry of a common duplex-type electrical receptacle device 10. Additionally, embodiments of an electrical wall plate 100 may include a light 170, such as an LED, as well as a button switch 175. The button switch 175 may be positioned for manual accessibility and operation. Still further, the light 170 may operate with a sensor that may be positioned in the button switch 175, wherein the sensor senses ambient light and is configured to send a signal to turn the light on when the sensed ambient light is below a predetermined brightness.

Embodiments of an electrical wall plate 100 may include camera movement control features 141, such as horizontal movement pin-hole control features 141a and 141b and vertical movement pin-hole control features 142a and 142b. The camera movement control features may be engaged by or otherwise manipulated by a user to move the camera 140 and/or a lens 140a of the camera 140, so that it points in a desired direction. For example, horizontal movement pin-hole control features 141a and 141b may be located on the left side or edge of the electrical wall plate 100. They may be sized so that a pin or a paperclip may be inserted to engage mechanical movement components and/or electrical servo motor switches accessible through the pin-holes. As such, a user who desired to move the camera 140 or lens of the camera 140 horizontally to the left may insert a pin, paperclip, or other slender instrument into the pin-hole control feature 141*a* to actuate movement of the camera or lens horizontally to the left. Likewise, if the user wanted to move the camera or lens horizontally to the right the user would insert a pin or paperclip into the pin-hole control feature 141*b* to engage the camera movement control features and effectuate movement of the camera 140 and/or lens of the camera 140 horizontally to the right.

In a similar fashion, vertical movement pin-hole control features 142*a* and 142*b* may be located on the top side or edge of the electrical wall plate 100. They may also be sized so that a pin, paperclip, or suitable instrument may be inserted to engage mechanical movement components and/or electrical servo motor switches accessible through the pin-holes. As such, a user who desired to move the camera 140 or lens of the camera 140 vertically upward may insert a pin or paperclip into the pin-hole control feature 142*a* to actuate movement of the camera or lens in an upward direction. Likewise, if the user wanted to move the camera or lens to point more vertically downward the user would insert a pin or paperclip into the pin-hole control feature 142*b* to engage the camera movement control features and effectuate movement of the camera 140 and/or lens of the camera 140 vertically downward.

Movement of the camera 140 or camera lens 140*a* can be by directly applied mechanical force, such as through control features 141, or indirectly through an electrical signal to servo motors. Furthermore, while particular configurations and positions of aperture controls 141*a*, 141*b*, 142*a*, and 142*b* have been described with respect to particular camera movements, reverse positioning and reverse movements, as well as other configurations can also be used, as would be appreciated by a person having ordinary skill in the art.

An external memory storage port 188 may also be located on the electrical wall plate 100. As particularly depicted in FIG. 1B, the external memory storage port, external memory port, or memory storage 188 may be located on a side or edge, such as the right side or edge. of the electrical wall plate 100, or at any suitable location along an edge or on a face of the wall plate 100. The external memory storage port 188 may be configured to receive and facilitate electrical communication with a corresponding external memory storage device.

Figure 1A:
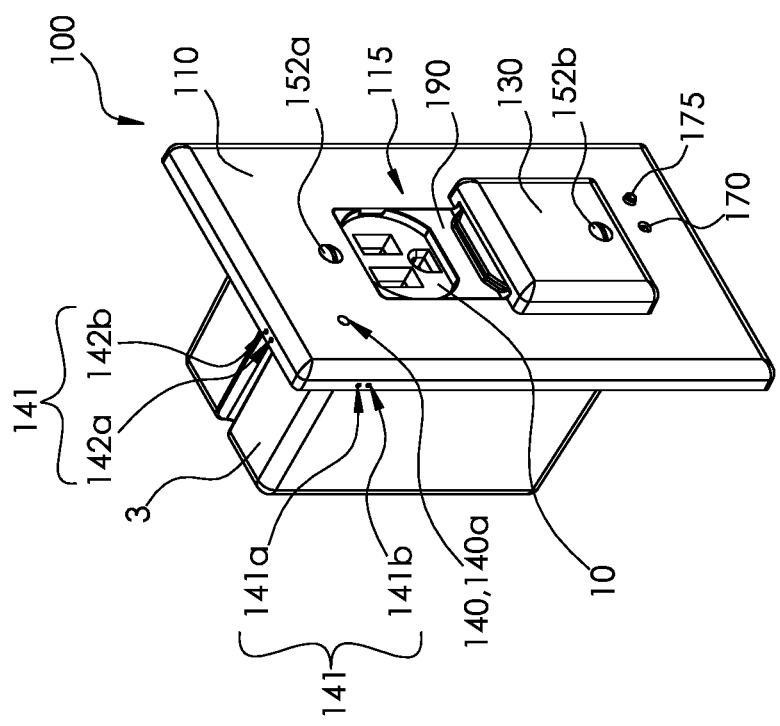
FIG. 1A illustrates a front left perspective view of an embodiment of an electrical wall plate comprising an integral electronic component or camera.

With further reference to the drawings, FIGS. 2A-2D depict top, left side, front, and right side views, respectively, of the electrical wall plate of FIGS. 1A and 1B. As can be seen, embodiments of an electrical wall plate 100 may comprise a rear face plate 120 opposing the front face plate 110. Furthermore, embodiments of an electrical wall plate 100 may mechanically and electrically mount to an electrical device 10, such as a light switch, electrical receptacle, socket fixture, or common duplex-type electrical receptacle device. The electrical device may be configured and structured so that it mounts to, and substantially within, an electrical box 3. The electrical box 3 may be located proximally closer to the rear face plate 120 of the electrical wall plate 100 than to the front plate face 110 when the electrical device 10 is mounted therein and the electrical wall plate 100 is mounted to the electrical device 10.

Figure 3:
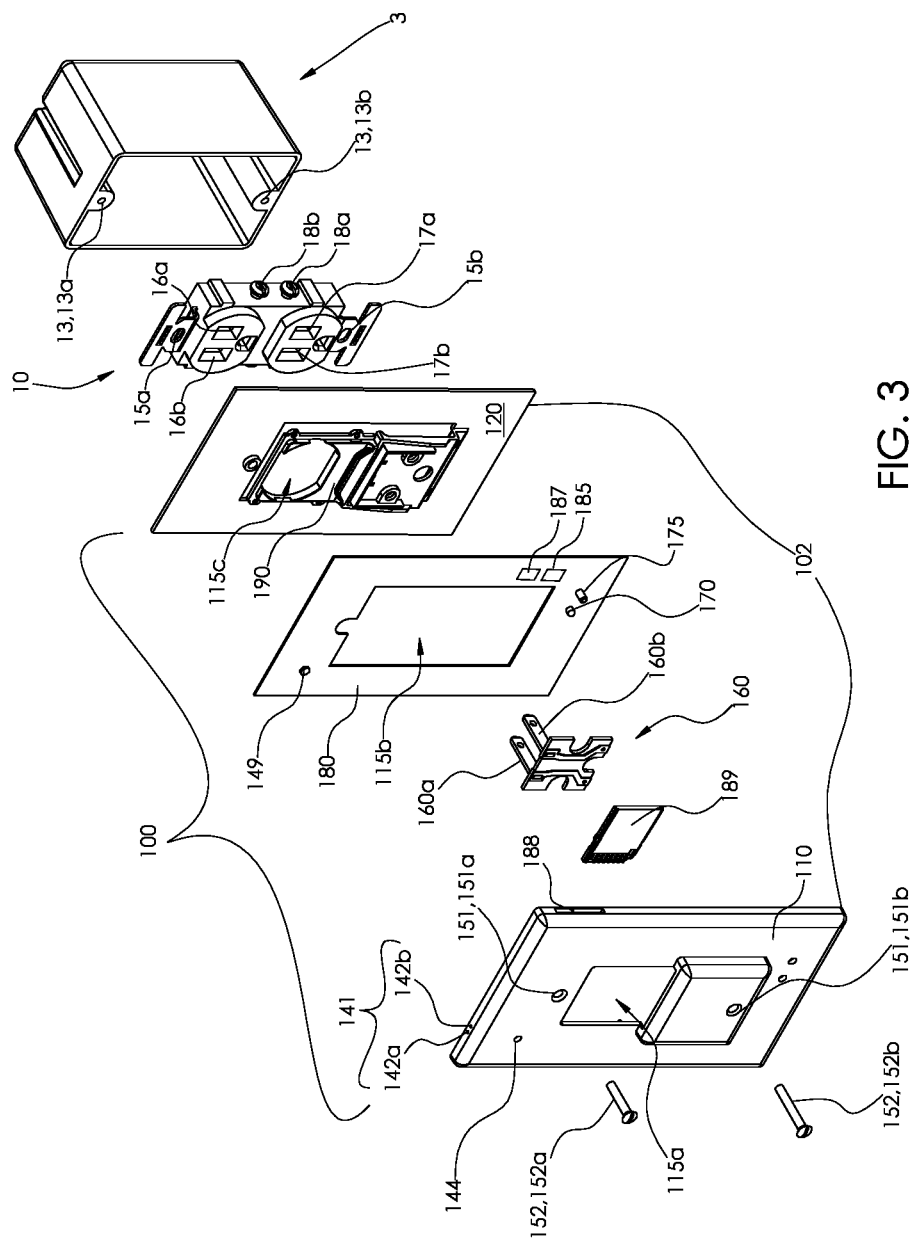
FIG. 3 illustrates an exploded perspective view of the electrical wall plate of FIGS. 1A and 1B, as well as an embodiment of an electrical device, an embodiment of an electrical box, and an embodiment of a removable external memory storage device.
Figure 5:
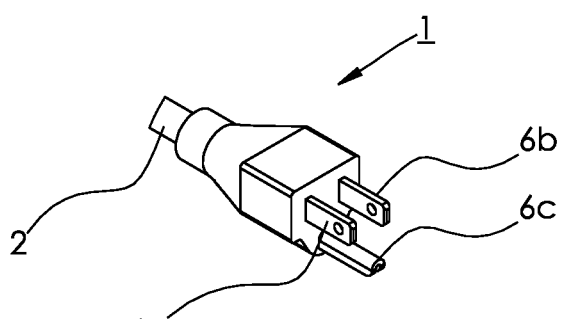
FIG. 5 illustrates a perspective view of an embodiment of an electrical plug.

Various components may be optionally integrated within various embodiments of the electrical wall plate 100, examples of which are illustrated in the exploded perspective view depicted of FIG. 3. The electrical wall plate 100 may be electrically connected to, and operate with power or electrical current passing through, a power connector 160 to allow the camera 14 to receive power from the electrical device 10, without relying on batteries or other power source. The power connector 160 may be conductive and configured to electrically couple or connect with power from the electrical device or electrical receptacle 10, so as to receive a continuous or continuing source of power. The power connector 160 may comprise male electrical plug blades or second male electrical plug blades 160*a* and 160*b* extending in a direction away from the face plate 102, and configured to connect with a female receiver or opening, or second female receiver or opening 17*a*, 17*b* of the electrical device 10. The electrical plug blades 160*a* and 160*b* may perpendicularly protrude beyond, and away from, the rear face plate 120, as well as extend away from the front plate face 110. As such, the electrical device 10 may allow for a power plug 1 coupled to an electrical cord 2 (see, e.g., FIG. 5) to extend through the electronic device opening 115 and couple with the first female receivers 16*a*, 16*b* of the electrical device 10 with male electrical plug blades 6*a*, 6*b*, and 6*c*. While, or at a same time as, power plug 1 is coupled to the electrical device 10, the power connector 160 with its male electrical plug blades 160*a* and 160*b* may be coupled to the second female receivers or openings 17*a*, 17*b* of the electrical device 110, allowing for both access to the electrical device 10 to power the camera 140 and simultaneously allowing for other devices or electrical cords to be plugged into the electrical device 10 without interfering with the operation of electrical device 10, or requiring any additional adapters.

As further illustrated in FIG. 3, embodiments of an electrical wall plate 100 may include a printed circuit board (PCB) 180. The PCB 180 may be disposed within the wall plate 100, such as between the front face plate 110 and the rear face plate 120. The PCB 180 may include an electrical device opening 115*b* corresponding to, and aligned with, the electrical device openings 115*a* and 115*c* extending through the front face plate 110 and the rear face plate 120, respectively, of the electrical wall plate 100. The three openings 115*a*, 115*b*, and 115*c* may together comprise an electrical device opening 115 through the entire electrical wall plate assembly 100, including the at least one face plate 102, which comprises front face plate 110 and rear face plate 120.

The wall plate 100 may also comprise plate mounting screw openings 151 configured to align with box mounting screw openings 13 and to receive box mounting screws 152. The one or more box screw openings 150, such as an upper box screw openings 150*a* and a lower box screw openings 150*b*, may be configured to operatively correspond with box mounting screw openings 13, such as upper box mounting screw opening 13*a* and lower box mounting screw openings 13*b*, respectively. The plate mounting screw openings 151 extend through the entirety of electrical wall plate 100 (such as through front face plate 110 and rear face plate 120) and may also be disposed through the PCB 180.

The one or more box mounting screws 152*a* and 152*b* may couple to the electrical wall plate 100 to the electrical device 10, such as a light switch or an electrical receptacle. The one or more box mounting screw openings 152*a* and 152*b* may be inserted in, and pass through, the one or more plate mounting screw openings 151*a* and 151*b*, through one or more corresponding openings 15*a* and 15*b* of an electrical device, such as an electrical device 10, and also through openings 13*a* and 13*b* of electrical box 3, to facilitate fastening of the electrical wall plate 100 to both the electrical device 10, such as a light switch or an electrical receptacle, and the electrical box 3.

Referring still to FIG. 3, the PCB 180 may be in electrical communication with the camera 140 and the power connector 160. Embodiments of the camera 140 may operate with a camera opening 144 disposed through the face plate 102 or the front face plate 110. A camera interface component 149 on the PCB 180 may couple the camera 140 to the PCB 180, as well as provide power and retrieve images and video. The camera 140 may be configured to pan, tilt, zoom, and otherwise move or adjust to a desired orientation for the capture of images and video. The camera movement control features 141, such as the horizontal and vertical pin-hole control features 142a and 142b may be located and configured to engage one or more of the camera 140, the camera lens 140a, the camera interface component 149, the PCB 180, or portions thereof, when the electrical wall plate 100 is mounted to and electrical device 10. In addition, embodiments of the camera 140 may physically and electrically connect to the camera interface component 149 of the PCB 180, wherein the camera interface component 149 may comprise servo motors. Thus, control elements of the PCB 180 may control functionality of the camera 140, in conjunction with user control via the camera movement control features 141, such as pin-hole control features 141a, 141b, 142a, and 142b. The camera 140 may be in electrical connection with the power connector 160 and the PCB 180 and may include powered mechanical elements associated with panning, tilting, and/or zooming. In addition, non-powered mechanical elements may also be provided to facilitate movement of the camera 140 to a desired position, when a user controls position via the camera movement control features 141, such as pin-hole control features 141a, 141b, 142a, and 142b. Thus, a camera movement control feature 141 may comprising externally-engageable components disposed on a side or on a front surface of the face plate 102, such as the front face plate 110, and be configured to movably position the camera 140 or a camera lens 140a by pan or tilt to point in different directions, whether by direct mechanical force or indirectly through an electrical signal to servo motors 149.

Embodiments of the electrical power connector 160 may include a plurality of connecting features, such as electrical plug blades 160a and 160b. Those of ordinary skill in the relevant art will recognize the electrical plug blades, such as electrical plug blades 160a and 160b, may be structures having standardized dimension and conductivity in compliance with common electrical devices, such as plug and receptacle features having standardized dimensions associated with various geographic regions. For instance, as depicted, the electrical plug blades 160a and 160b are structured in accordance with typical plug blade structure in the United States and Canada. However, plug blades, or rather electrical power connector 160 features of embodiments of an electrical wall plate 100 may be structured in accordance with other geographic areas, such as continental Europe, the UK, Australia, China, Japan and any other geographic area having known standardized structure and performance requirements. Likewise, those of ordinary skill in the art will recognize that the component elements of the electrical wall plate 100 may be configured for operation applicable to any voltage, amperage, frequency, wattage, and/or other like electromagnetic characteristic commensurate with standardized functional requirements pertaining to any geographical area. The PCB 180 and other electronic components, such as the camera 140 may function with assistance of known conversion elements, such as operation by transformers, resisters, capacitors, diodes, transistors, A/D converters, integrated circuits and/or other like basic electronic components.

The PCB 180 may facilitate signal processing, device control (electrically, mechanically, or both), signal transmission, data manipulation and storage, user interface and control, and other like functionality. For example, a transmitter 185, such as a powered antenna, may be in electrical communication with the PCB 180. Moreover, an integrated memory storage device 187 may also be in electrical communication with the PCB. The integrated memory storage device 187 may be a permanent hard-wired structure. In addition, the PCB may be in electrical communication with a removable external memory storage device 189, such as a memory card, such as a SD card. The removable external memory storage device 189 may physically and electrically mate with and be received by an external memory storage port 188, wherein the external memory storage port 188 may also be located on the electrical wall plate 100 and be in electrical communication with the PCB 180.

Devices, in communication with the PCB 180, may operate with electronic components including other separate PCBs, and/or may facilitate functionality of electronic components, such as the camera 140. For instance, sill images or video captured by the camera 140 may be processed through the PCB 180 and directed for storage in the integrated memory storage device 187 and/or in the removable external memory storage device 189. Furthermore, video images captured by the camera 140 may be processed through the PCB 180 and directed for wireless transmission by the transmitter 185 to an external receiver. Such wireless transmission may include signal transmissions by the transmitter 185 to a wireless local area network receiver (WLAN), such as a Wi-Fi® receiver, signal transmissions by the transmitter 185 to a wireless personal area network receiver (WPAN), such as a Bluetooth® receiver, and/or the wireless transmissions may comprise other like electromagnetic signal transmissions. In addition, it is contemplated that the transmitter 185 may operate via the infrared spectrum, the ultraviolet spectrum, via visible laser light projections, via sonic or ultrasonic transmission, and/or by any other means of operable wireless signal transmission. Still further, the transmitter 185 may transmit over-wire signals, such as analog and/or digital signals passed through the power connector 160 to the electrical power lines connected to the electrical device to which the electrical wall plate 100 may be physically and/or electrically connected. Embodiments of an electrical wall plate 100 may also include a wireless receiver to receive wireless transmissions such as control signals sent from an external source to control operation of the camera 140 via pan and tilt motors.

A button switch 175 may be in electrical communication with the PCB 180. The button switch 175 may facilitate pairing of the transmitter 185 with a wireless receiver. A plurality of button switches, such as button switch 175, may be integrated into an embodiment of the electrical wall plate 100. In addition, a light 170, such as a light emitting diode (LED), may be in electrical communication with the PCB 180. The light 170 may function to visually represent operation of one or more electronic components of the electrical wall plate 100. For instance, the light 170 may blink while the transmitter 185 is pairing with an external receiver, to indicate that the pairing process is properly occurring, it may emit a steady color to indicate normal functionality, it may provide a series of pulses corresponding to user programming instructions and user interfacing, it may turn on during operation of camera 140 to indicate that the camera 140 is properly functioning, and/or the light 170 may be utilized for any other means of information conveyance and user-engagement.

Figure 4:
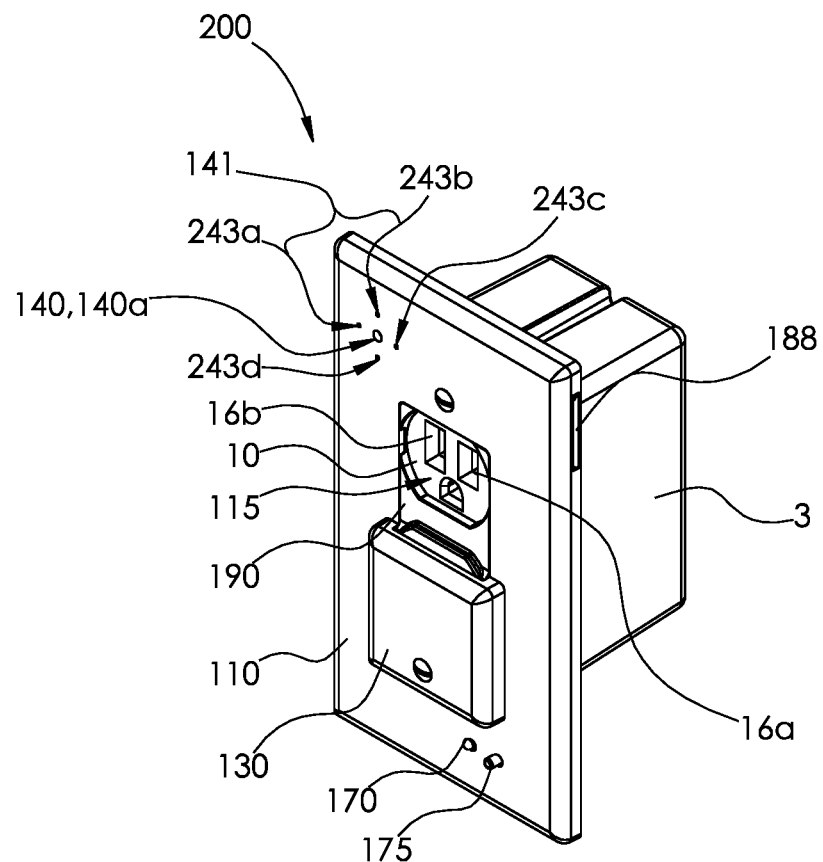
FIG. 4 illustrates a perspective view of another embodiment of an electrical wall plate comprising an integral electronic component or camera.

With further reference to the drawings, FIG. 4 depicts a perspective view of another embodiment of an electrical wall plate 200 comprising the integral electronic component, or camera 140. Many structural and functional aspects of an embodiment of an electrical wall plate 200 may be similar to corresponding structural and functional aspects of an embodiment of an electrical wall plate 100. Moreover, the perspective view associated with the elemental features depicted in FIG. 4 has been presented in a manner similar to FIG. 1B, and those in the art will appreciate that structural features and configurations corresponding to the electrical wall plate embodiment 100 of FIG. 1B likewise correspond to structural features depicted in FIG. 4. In addition, numeration of component features has been similarly set forth, wherein an embodiment of an electrical wall plate 200 may include a front plate face 110, a rear plate face 120, and an electrical device opening 115 that may extend through the front plate face 110 and rear plate face 120 of the electrical wall plate 200. The electrical wall plate 200 may also include a housing 130 that may house electronic components. Similarly, embodiments of an electrical wall plate 200 may operate with box mounting screws 152a and 152b, that extend through the electrical wall plate 200, as well as an adapter 190 configured to adapt the electrical wall plate 200 to a corresponding structural configuration of an electrical device to which the electrical wall plate 200 will be mounted. The electrical wall plate 200 may include integral electronic components such as a light 170, a button switch 175, and an external memory storage port 188. Furthermore, an electrical wall plate 200 may include a power connector 160 configured to conductively engage an electrical device, such as by electrical plug blades 160a and 160b, or by other conductive elements provided to engage the power transmission features of the electrical device.

Embodiments of an electrical wall plate, such as electrical wall plates 100 and 200, as well as electrical wall plates 300 and 400 described further herein, and the like, may be configured to connect with be electrically connected to, and operate with power or electrical current passing through, a power connector 160 to allow the camera 14 to receive power from the electrical device 10, without relying on batteries or other power source. The power connector 160 may be conductive and configured to electrically couple or connect with power from the electrical device or electrical receptacle 10, so as to receive a continuous or continuing source of power. The power connector 160 may comprise male electrical plug blades or second male electrical plug blades 160a and 160b extending in a direction away from the face plate 102, and configured to connect with a female receiver or opening, or second female receiver or opening 17a, 17b of the electrical device 10. The electrical plug blades 160a and 160b may perpendicularly protrude beyond, and away from, the rear face plate 120, as well as extend away from the front plate face 110. As such, the electrical device 10 may allow for a power plug 1 coupled to an electrical cord 2 (see, e.g., FIG. 5) to extend through the electronic device opening 115 and couple with the first female receivers 16a, 16b of the electrical device 10 with male electrical plug blades 6a, 6b, and 6c. While, or at a same time as, power plug 1 is coupled to the electrical device 10, the power connector 160 with its male electrical plug blades 160a and 160b may be coupled to the second female receivers or openings 17a, 17b of the electrical device 110, allowing for both access to the electrical device 10 to power the camera 140 and simultaneously allowing for other devices or electrical cords to be plugged into the electrical device 10 without interfering with the operation of electrical device 10, or requiring any additional adapters.

Embodiments of the electrical box 3 may reside on the side of the electrical wall plate 200 associated with the rear plate face 120, while the camera 140 may reside on the side of the electrical wall plate 200 associated with the front plate face 110. The electrical device 10, such as an electrical receptacle, may reside substantially within the electrical box 3, and may include electrical connection features that are accessible when the electrical box 3 is mounted to the electrical wall plate 100.

In contrast to an electrical wall plate 100, embodiments of an electrical wall plate 200 may include a camera 140 that is adjustable via user interface with front plate face aperture controls 243a-d. The top, left side, front, and right side view depictions of FIGS. 6A-6D further illustrate the differing structure and functionality of an electrical wall plate 200. For example, as illustrated, the position adjustment of camera 140 may be facilitated by user engagement with aperture controls located only on the front place face 110 of the electrical wall plate 200. Movement control features, such as front plate face aperture controls 243a-d, may be engaged by or otherwise manipulated by a user to move the camera 140 and/or a lens of the camera 140, so that it points in a desired direction. For example, front plate face aperture controls 243b and 243d may facilitate movement vertically up and down of the camera 140 and/or lens of the camera 140. The front face plate aperture controls 243a and 243c may facilitate movement horizontally left and right of the camera 140 and/or a lens of the camera 140. Like the pin-hole control features 141a-d of electrical wall plate 100, the front plate face aperture controls 243a-d may be sized so that a pin or a paperclip may be inserted to engage mechanical movement components and/or electrical servo motor switches accessible through the apertures. As such, a user who desired to move the camera 140 or lens of the camera 140 horizontally to the left may insert a pin or paperclip into the front face plate aperture control 243a to actuate movement of the camera or lens horizontally to the left. Likewise, if the user wanted to move the camera or lens horizontally to the right the user would insert a pin or paperclip into the front face plate aperture control 243c to engage the camera movement control features and effectuate movement of the camera 140 and/or lens of the camera 140 horizontally to the right. In a similar fashion, vertical movement front plate face aperture controls 243b and 243d may also be sized so that a pin or a paperclip may be inserted to engage mechanical movement components and/or electrical servo motor switches accessible through the apertures. As such, a user who desired to move the camera 140 or lens of the camera 140 vertically upward may insert a pin or paperclip into the front face plate aperture control 243b to actuate movement of the camera or lens in an upward direction. Likewise, if the user wanted to move the camera 140 and/or a lens of the camera 140 to point more vertically downward the user would insert a pin or paperclip into the front face plate aperture control 243d to engage the camera movement control features and effectuate movement of the camera 140 and/or lens of the camera 140 vertically downward.

Movement of the camera 140 or camera lens 140a can be by directly applied mechanical force or indirectly through an electrical signal to servo motors through camera movement control features 141, such as face plate aperture controls 243a, 243b, 243c, and 243d. Furthermore, while particular configurations and positions of aperture controls 243 have been described with respect to particular camera movements, reverse positioning and reverse movement or other configurations can also be used, as would be appreciated by a person having ordinary skill in the art.

An external memory storage port 188 may also be located on the electrical wall plate 200. As particularly depicted in FIG. 6D, the external memory storage port 188 may be located on the right side or edge of the electrical wall plate 200. The external memory storage port 188 may be configured to receive and facilitate electrical communication with a corresponding external memory storage device, such as memory storage device 189.

Figure 7:
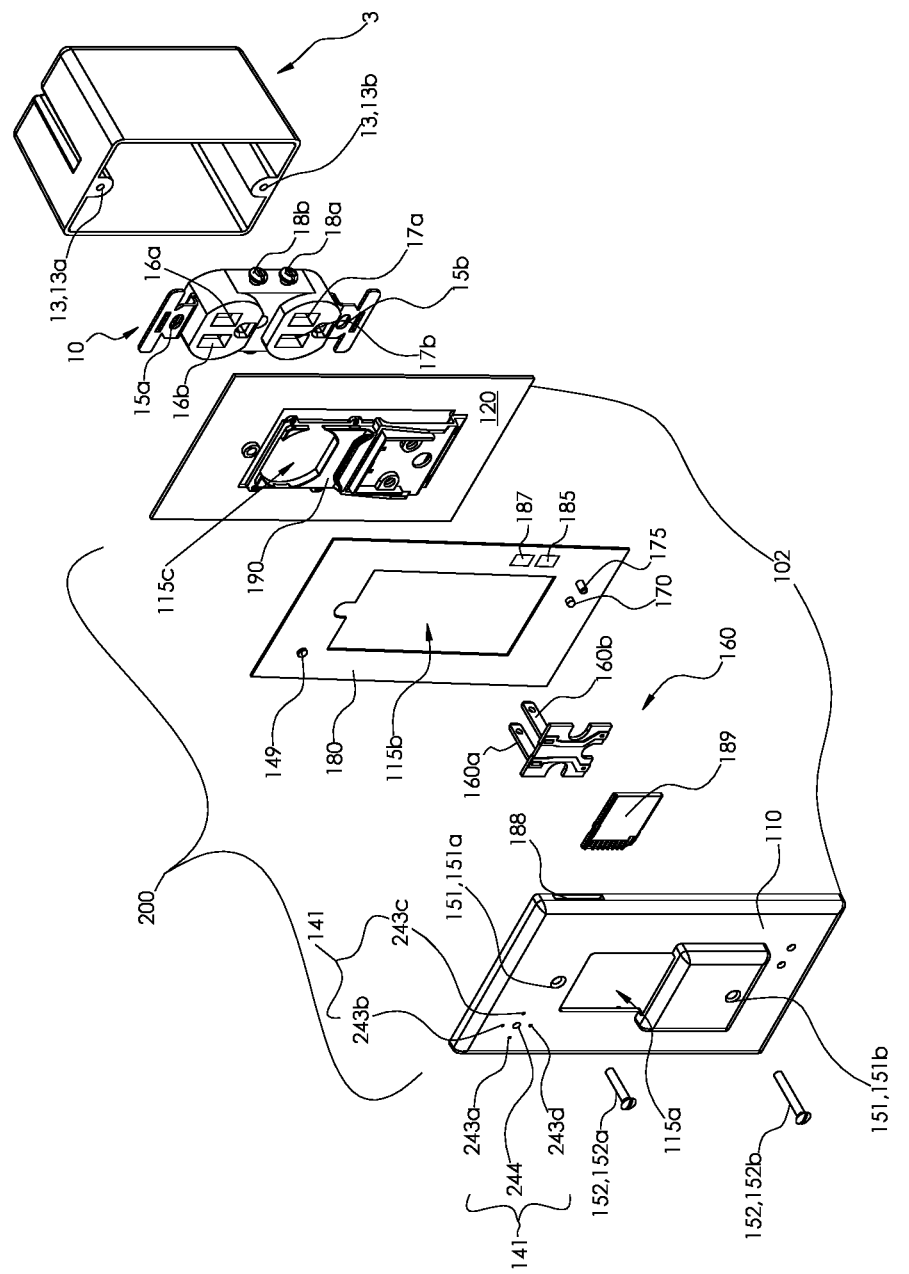
FIG. 7 illustrates an exploded perspective view of the electrical wall plate of FIG. 4, as well as an embodiment of an electrical device, an embodiment of an electrical box, and an embodiment of a removable external memory storage device.
Figure 9A:
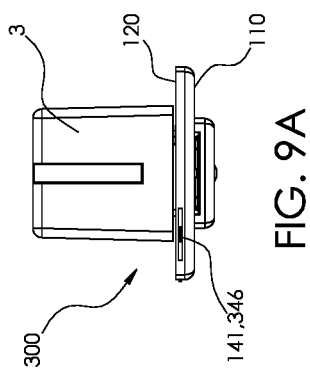
FIG. 9A illustrates a top view of the electrical wall plate of FIGS. 8A and 8B.
Figure 9D:
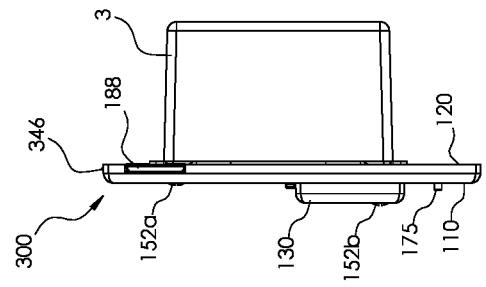
FIG. 9D illustrates a right side view of the electrical wall plate of FIGS. 8A and 8B.
Figure 9C:
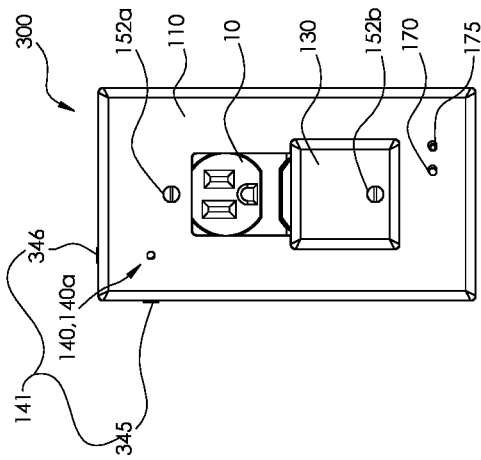
FIG. 9C illustrates a front view of the electrical wall plate of FIGS. 8A and 8B.
Figure 9B:
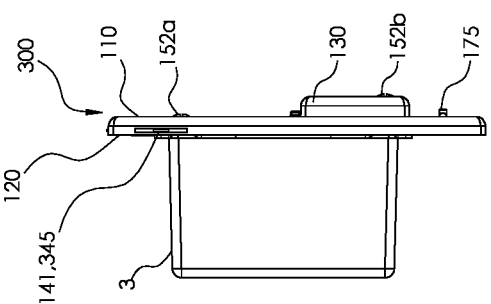
FIG. 9B illustrates a left side view of the electrical wall plate of FIGS. 8A and 8B.

With further reference to the drawings FIG. 7 depicts an exploded perspective view of the electrical wall plate 200 of FIG. 4, as well as an embodiment of an electrical device 10, an embodiment of an electrical box 3, and an embodiment of a removable external memory storage device 189. Like embodiments of an electrical wall plate 100, embodiments of an electrical wall plate 200 include integral electronic components, such as the camera 140, the light 170 and the button switch 175, that may be in electrical connection with a power connector, such as power connector 160 having electrical plug blades 160a and 160b, and may be configured to operate by electrical power obtained from the electrical device 10, when the power connector 160 is connected to the power transmission conductor, such as female receivers 16a and 16b and/or wire mounts 18a and 18b, of the electrical device 10. The female receivers 16a and 16b may be configured to receive and electrically engage the electrical plug blades 160a and 160b, when the electrical wall plate 200 is mounted on the electrical device 10. Those of ordinary skill in the art will recognize that electrical connection between the electrical wall plate 200 and the electrical device 10 may be operatively effectuated by connection with the female receivers 16a and 16b and/or the wire mounts 18a and 18b, with each connection arrangement offering different advantages. For instance, electrical connection between the power connector 160, such as electrical plug blades 160a and 160b, and the female receivers 16a and 16b may happen commensurate with the engagement of the electrical wall plate 200 with the electrical device 10, as the electrical wall plate 200 is mounted to the electrical device 10. A direct wired connection, utilizing a wired power connector 160 electrically connected with and physically mounted to the wire mounts 18a and 18b may facilitate continuous electrical connection of the electrical wall plate 200 with the electrical device 10, such as an electrical receptacle, even if the electrical wall plate 200 is spaced apart a distance from the electrical device 10 and not fully physically mounted and/or fastened thereto.

Electronic components integrated into the electrical wall plate 200, such as the camera 140, may be powered with electricity obtained through an electrical connection of the electrical wall plate 200 and the electrical device 10 via engagement and reception of the power connector 160, such as electrical plug blades 160a and 160b, with the power transmission conductor, such as female receivers 16a and 16b, of the electrical device 10. The electronic components may operate with a PCB 180. For instance, a transmitter 185 and internal memory storage 187 may operate with other electrical components, such as the camera 140, removable external memory storage 189, or the light 175 via circuitry of the PCB 180. Embodiments of the camera 140 may operate with a front face opening 144 and a camera interface component 149 on the PCB 180.

Referring still further to the drawings, FIGS. 8A and 8B depict another embodiment of an electrical wall plate 300 mounted to an embodiment of an electrical device 10 and an embodiment of an electrical device 3. Many structural and functional aspects of an embodiment of an electrical wall plate 300 may be similar to corresponding structural and functional aspects of an embodiment of an electrical wall plate 100 and/or to an embodiment of an electrical wall plate 200. Moreover, the perspective view associated with the elemental features depicted in FIGS. 8A and 8B has been presented in a manner similar to FIGS. 1A, 1B, and 4, and those in the art will appreciate that structural features and configurations corresponding to the electrical wall plate embodiment 100 and/or to the electrical wall plate embodiment 200 likewise correspond to structural features depicted in FIGS. 8A and 8B in correspondence with electrical wall plate embodiment 300. Accordingly, numeration of component features has been similarly set forth, wherein like features are identified by like numeration. Nevertheless, in contrast to electrical wall plate embodiments 100 and/or 200, embodiments of an electrical wall plate 300 may include a camera 140 that is adjustable via a user interface or camera movement control features 141, which may comprise one or more slider mechanisms controls, such as slider mechanism controls 345 and 346, located on the side(s) of electrical wall plate 300.

The differing structure and functionality of an electrical wall plate 300 is further depicted in the top, left side, front, and right side view illustrations set forth in FIGS. 9A-9D, respectively. Movement control features, such as slider mechanism controls 345 and 346, may be engaged by or otherwise manipulated by a user to move the camera 140 and/or a lens 140a of the camera 140, so that it points in a desired direction. For instance, a vertical slider mechanism control 345 may be located on the left side of the electrical wall plate 300 and may facilitate movement vertically up and down of the camera 140 and/or lens 140a of the camera 140. Moreover, a slider mechanism control 346 may be located on the top of the electrical wall plate 300 and may facilitate movement horizontally left and right of the camera 140 and/or a lens 140a of the camera 140. A user who desired to move the camera 140 or lens 140a of the camera 140 vertically upward may engage the slider mechanism control 345 and slide it upward to effectuate movement of the camera 140 and/or a lens of the camera 140 in an upward direction. The distance the slider mechanism control 345 is slid upward may correspond to the degree of upward angular direction that the camera 140 and/or a lens of the camera 140 may be variably positioned. Similarly, if the user wanted to move the camera 140 and/or a lens of the camera 140 so that it points vertically downward, the slider mechanism control 345 may be slid vertically downward until the camera 140 or lens of the camera 140 is correspondingly pointed in the desired downwardly-angled position.

In a like manner, a user who desired to move the camera 140 or lens of the camera 140 horizontally to the left may engage the horizontal slider mechanism control 346 and slide it to the left to effectuate movement of the camera 140 and/or a lens of the camera 140 in left horizontal direction. The distance the slider mechanism control 346 is slid to the left may correspond to the degree of leftward angular direction that the camera 140 and/or a lens 140a of the camera 140 may be variably positioned. In the same way, if a user wanted to move the camera 140 and/or a lens 140a of the camera 140 so that it points horizontally toward the right, the slider mechanism control 346 may be slid horizontally to the right until the camera 140 or lens of the camera 140 is correspondingly pointed in the desired rightwardly-angled position. One of ordinary skill in the art will appreciate that appropriate actuation of the slider mechanism may effectuate movement of the camera 140 or a lens 140*a* of the camera 140 toward and into any angularly directed position desired by a user with regard to the field of view presented to front face plate 110.

Movement of the camera 140 or camera lens 140*a* can be by directly applied mechanical force or indirectly through an electrical signal to servo motors through camera movement control features 141, such as dial mechanism controls 447 and 448. Furthermore, while particular configurations and positions of the dial mechanism controls 447 and 448 have been described with respect to particular camera movements, reverse positioning and reverse movement or other configurations can also be used, as would be appreciated by a person having ordinary skill in the art.

An external memory storage port 188 may also be located on the electrical wall plate 300 and may be configured to receive and facilitate electrical communication with a corresponding external memory storage device, such as memory storage device 189.

Figure 10:
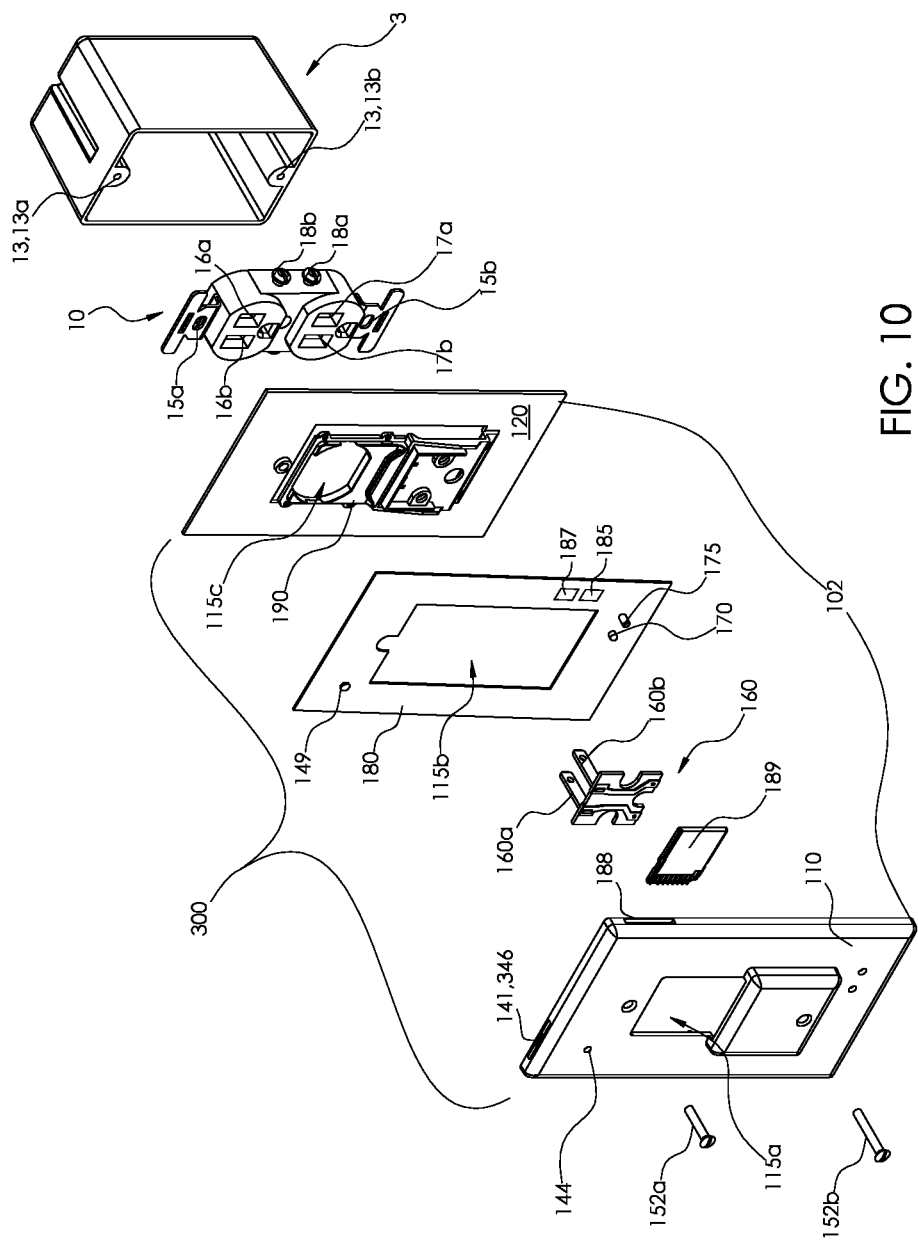
FIG. 10 illustrates an exploded perspective view of the electrical wall plate of FIGS. 8A and 8B, as well as an embodiment of an electrical device, an embodiment of an electrical box, and an embodiment of a removable external memory storage device.

Comparable to embodiments of an electrical wall plate 100 and/or an electrical wall plate 200, embodiments of an electrical wall plate 300 include integral electronic components, as depicted in FIG. 10, such as the camera 140, the light 170 and the button switch 175, that may be in electrical connection with a power connector, such as power connector 160 having electrical plug blades 160*a* and 160*b*, and may be configured to operate by electrical power obtained from the electrical device 10, when the power connector 160 is connected to the power transmission conductor, such as female receivers 17*a* and 17*b* and/or wire mounts 18*a* and 18*b*, of the electrical device 10. The female receivers 17*a* and 17*b* may be configured to receive and electrically engage the electrical plug blades 160*a* and 160*b*, when the electrical wall plate 300 is mounted on the electrical device 10. Again, those of ordinary skill in the art will recognize that electrical connection between the electrical wall plate 300 and the electrical device 10 may be operatively effectuated by connection with the female receivers 17*a* and 17*b* and/or the wire mounts 18*a* and 18*b*, with each connection arrangement offering different advantages. Electronic components integrated into the electrical wall plate 300, such as the camera 140, may operate with a PCB 180. For instance, a transmitter 185 and internal memory storage 187 may operate with other electrical components, such as the camera 140, removable external memory storage 189, or the light 175 via circuitry of the PCB 180. Embodiments of the camera 140 may operate with a front face opening 144 and a camera interface component 149 on the PCB 180.

With further reference to the drawings, another embodiment of an electrical wall plate 400 mounted to an embodiment of an electrical device 10 and an embodiment of an electrical device 3 is depicted FIGS. 11A and 11B. Again, many structural and functional aspects of an embodiment of an electrical wall plate 400 may be similar to corresponding structural and functional aspects of embodiments of one or more of the electrical wall plates 100, 200, and 300. Additionally, the perspective view associated with the elemental features depicted in FIGS. 11A and 11B has likewise been presented in a manner similar to FIGS. 1A, 1B, 4, 8A, and 8B, and those having ordinary skill in the art will appreciate that structural features and configurations corresponding to one or more of the electrical wall plate embodiments 100, 200 and 300 that similarly correspond to structural features depicted in FIGS. 11A and 11B for electrical wall plate embodiment 400. As such, numeration of component features has been correspondingly set forth, wherein like features are identified by like numeration. Yet, in contrast to electrical wall plate embodiments 100, 200 and/or 300, embodiments of an electrical wall plate 400 may include a camera 140 that is adjustable via user interface with one or more camera movement control features 141, such as dial mechanisms controls like dial mechanism controls 447 and 448, located on the side(s), face(s) or suitable surfaces of the electrical wall plate 400.

As shown in the top, left side, front, and right side view illustrations set forth respectively in FIGS. 12A-12D, camera movement control features 141, such as dial mechanism controls 447 and 448, may be actuated and spun by a user to move the camera 140 and/or a lens 140*a* of the camera 140, so that it points in a desired direction. A user may engage the dial mechanism control 447 and spin it upward to effectuate movement of the camera 140 and/or a lens of the camera 140 in an upward direction. The rotational distance the dial mechanism control 447 is spun upward may correspond to the degree of upward angular direction that the camera 140 and/or a lens 140*a* of the camera 140 may be variably positioned. In addition, a user may spin the dial mechanism control 447 rotationally downward until the camera 140 or lens 140*a* of the camera 140 is correspondingly pointed in the desired downwardly-angled position. Also, a user may engage the dial mechanism control 448 and spin it rotationally to the left to effectuate movement of the camera 140 and/or a lens 140*a* of the camera 140 in left horizontal direction and may spin the dial mechanism control 448 rotationally to the right to effectuate movement of the camera 140 or lens of the camera 140 in a right horizontal direction. The distance the dial mechanism control 448 is spun, either to the right or to the left, may correspond to the variable degree of angular direction that the camera 140 and/or a lens 140*a* of the camera 140 may be correspondingly positioned toward and into any angularly directed position desired by a user. In some instances, the camera movement control features 141, including one or more dial mechanism controls, sliders, or opening/pin holes may be used to increase or decrease zoom of the camera 140 or positioning of the lens 141, as well as increase or decrease the field of view of the camera 140.

Movement of the camera 140 or camera lens 140*a* can be by directly applied mechanical force or indirectly through an electrical signal to servo motors through camera movement control features 141, such as face plate aperture controls 243*a*, 243*b*, 243*c*, and 243*d*. Furthermore, while particular configurations and positions of aperture controls 243 have been described with respect to particular camera movements, reverse positioning and reverse movement or other configurations can also be used, as would be appreciated by a person having ordinary skill in the art.

An external memory storage port 188 may also be located on the electrical wall plate 400 and may be configured to receive and facilitate electrical communication with a corresponding external memory storage device, such as memory storage device 189.

Figure 13:
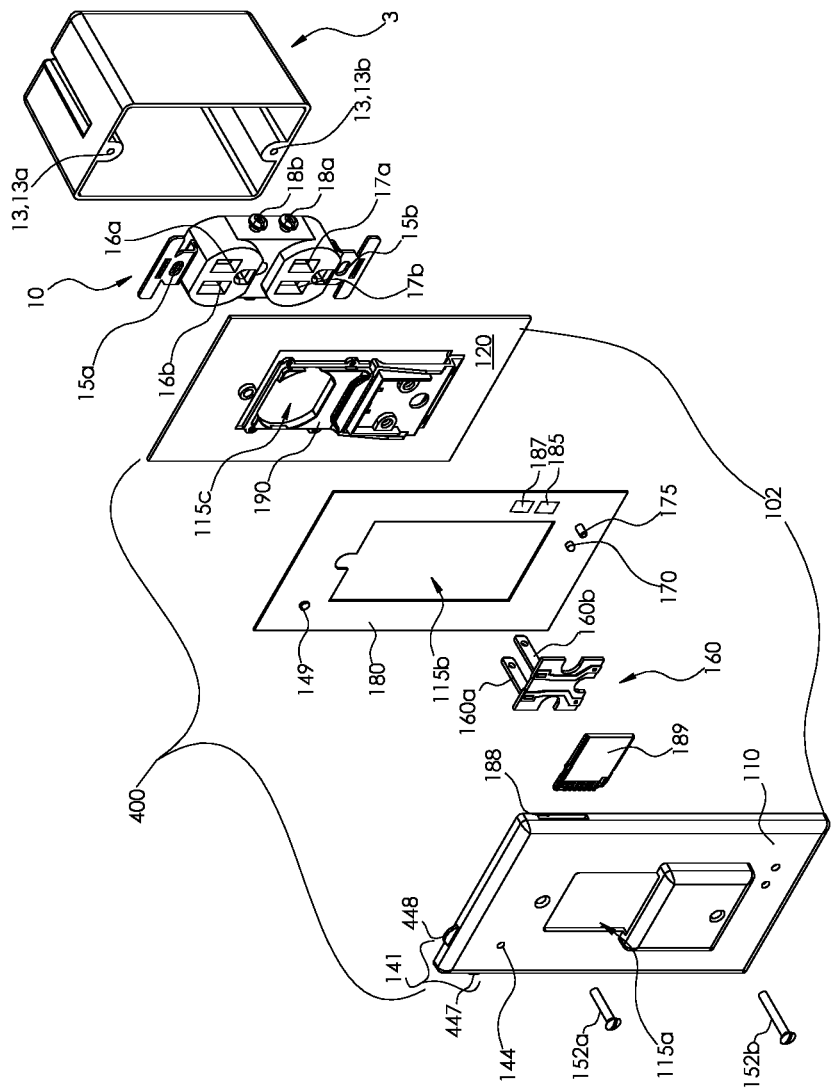
FIG. 13 an exploded perspective view of the electrical wall plate of FIGS. 10A and 10B, as well as an embodiment of an electrical device, an embodiment of an electrical box, and an embodiment of a removable external memory storage device.

Like the depictions of embodiments of an electrical wall plate 100, 200, and 300 shown respectively in FIGS. 3, 7, and 10, embodiments of an electrical wall plate 400, as depicted in FIG. 13, may include integral electronic components, such as the camera 140, the light 170 and the button switch 175, that may be in electrical connection with a power connector, such as power connector 160 having electrical plug blades 160*a* and 160*b*, and may be configured to operate by electrical power obtained from the electrical device 10, when the power connector 160 is connected to the power transmission conductor, such as female receivers 17a and 17b and/or wire mounts 18a and 18b, of the electrical device 10. Electronic components integrated into the electrical wall plate 400, such as the camera 140, may electrically connect with circuitry of a PCB 180 and operate with components such as a transmitter 185 and internal memory storage 187, external memory storage 189, and/or a light 175. Again, embodiments of the camera 140 may operate with a front face camera opening 144 and a camera interface component 149 on the PCB 180.

Embodiments of an electrical wall plate 100, 200, 300, 400 and the like may be mounted to an electrical box 3. When mounted to the electrical box 3, an electronic component, such as a camera 140 and the like may remain highly visible and capable of capturing video images of the environment located in front of the front plate faces 110 of the electrical wall plate(s) 100, 200, 300, 400 and the like. Additionally, the rear plate faces 120 of the electrical wall plate 100, 200, 300, 400 and the like may be flush-mounted to the electrical box 3 and thereby protect the electrical device 10, such as an electrical receptacle or a light switch, which is housed by the electrical box 3, from undesired accessibility.

Figure 14:
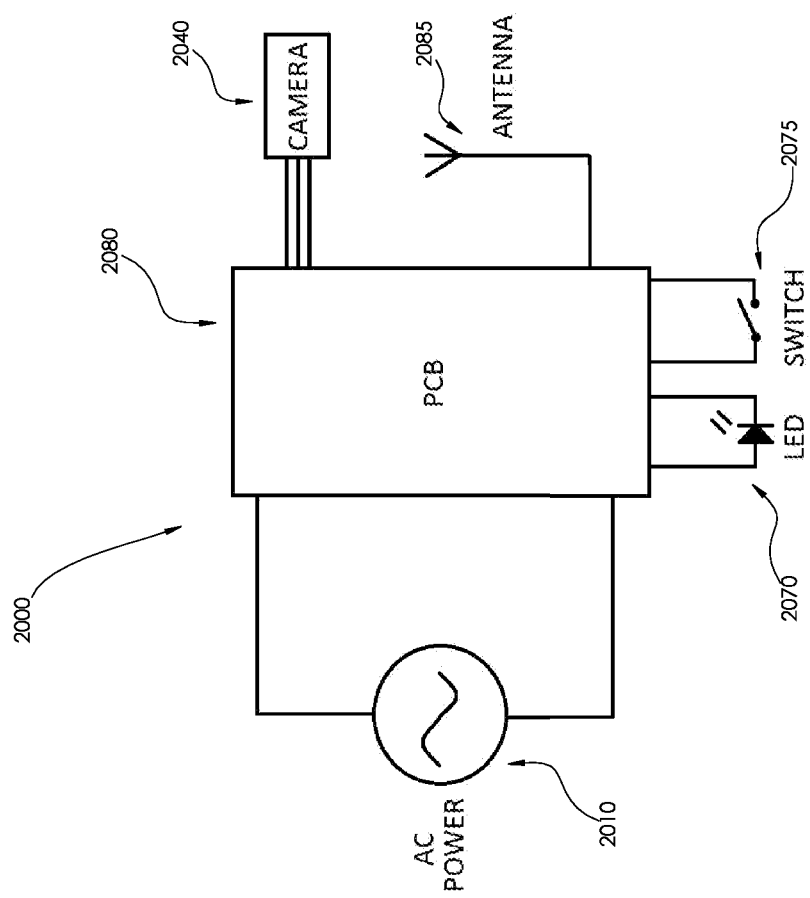
FIG. 14 illustrates a schematic view of an embodiment of an electrical circuit operably corresponding to an embodiment of an electrical wall plate comprising an integral electronic component.

Referring still further to the drawings, FIG. 14 depicts a schematic view of an embodiment of an electrical circuit 2000 operably corresponding to an embodiment of an electrical wall plate, such as electrical wall plates 100, 200, 300 and/or 400 comprising an integral electronic component such as cameras 140 and 2040. A printed circuit board 2080 is electrically connected to the camera, such as camera 2040, AC electrical power 2010, an LED light 2070, a button switch 2075, and a transmitter antenna 2085. As shown schematically, when the camera, such as camera 2040, is electrically powered by electricity, such as AC power 2010, obtained through electrical connection of the electrical wall plate, such as electrical wall plate 100, 200, 300, 400, and the electrical device 10, the electrically connected PCB 2080 may help facilitate controlled operation of the camera 2040.

FIGS. 15A-18B illustrate various views of an embodiment of an electrical wall plate 500 comprising an integral electronic component or camera 140, similar to electrical wall plates 100, 200, 300, and 400 as described herein with respect to the other figures. A person of ordinary skill in the art (POSA) will understand that like reference numbers refer to like features, and any exemplary features described with respect to electrical wall plates 100, 200, 300, 400, and 500 may be applied to, or used with, any variation, combination, or permutation of any other electrical wall plate 100, 200, 300, 400, and 500 shown and described herein, including with respect to various camera movement control features 141 and power connectors 160.

FIGS. 15A-18B differ from the previous figures by including a camera 140 formed comprising a ball and socket arrangement 143. The camera lens 140a may be disposed within the camera ball 143a, and the ball 143a may be coupled to, or partially disposed within, the socket 143b of the camera 140. By being configured as a ball and socket structure 143, camera movement control feature 141 of the ball and socket cameral 143 may be the ball 143a, which may be moveable or positionable within the socket 143b. As such, the ball and socket structure 143 may allow (or being configured or adapted to allow) the camera lens 140a to be adjusted, moved, or controlled, by pan or tilt to point in different directions, such as by directly applied mechanical force or indirectly through an electrical signal to servo motors.

Figure 15B:
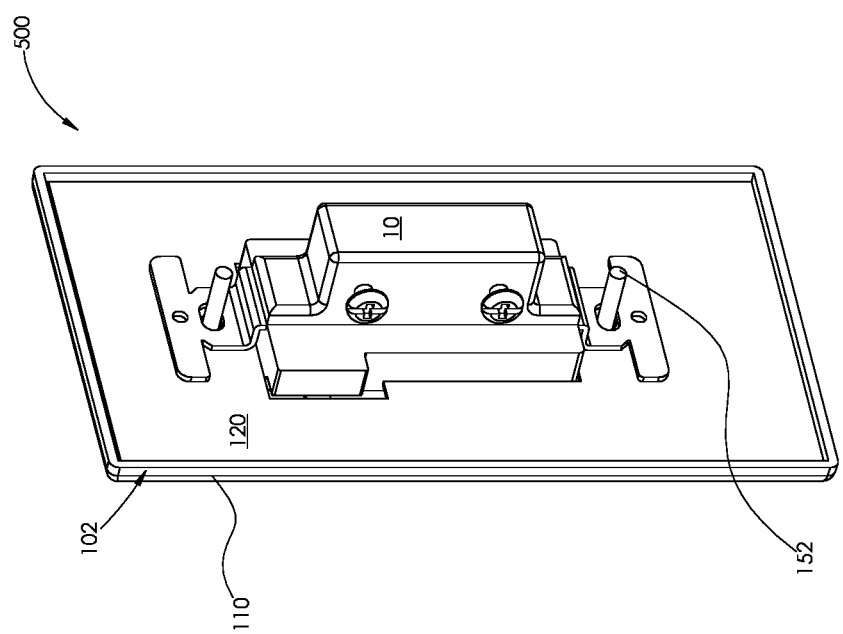
Figure 15C:
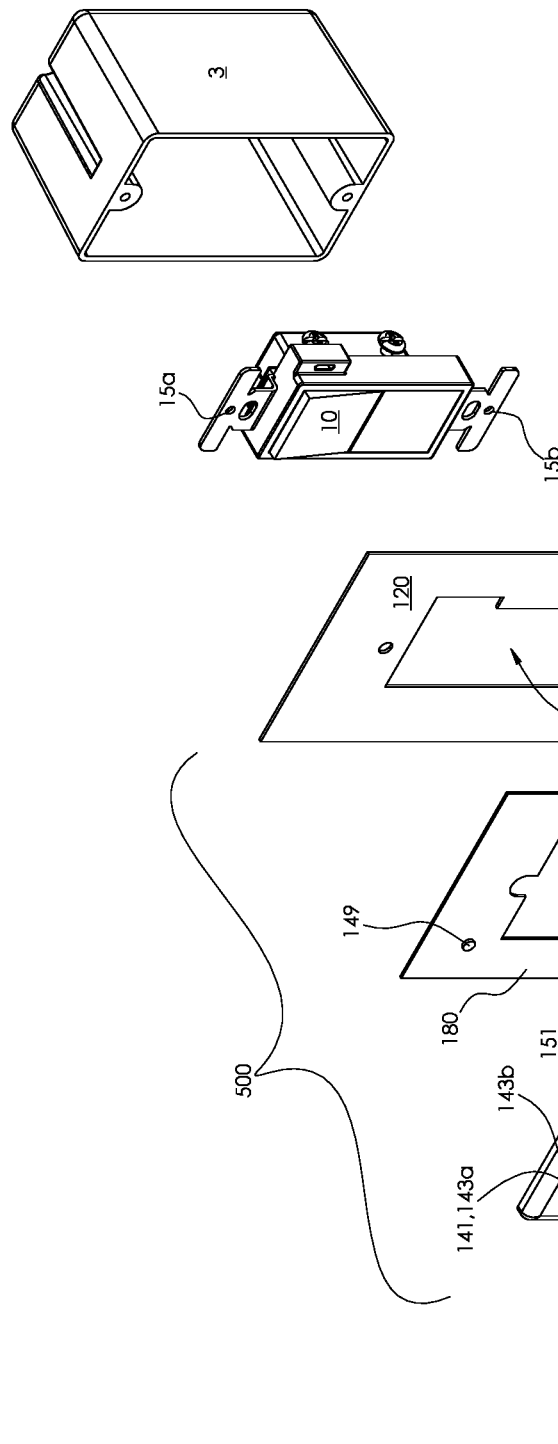

FIG. 15A shows a front perspective view of the electrical all plate 500, and also provides an illustration of the electrical device 10 being a light switch 10, which may be one or more of a toggle light switch, dimmer, turn dial, plunger, flip switch, touch pad, remote wirelessly controlled interface, or any other suitable switch. In some instances, the electrical device 10 may comprise at least one light switch, at least one electrical receptacle, or both, as well as any other suitable arrangement of known electrical devices. FIG. 15B shows a rear perspective view of an electrical wall plate 500 with the camera 140 hidden from view on the front face plate 110. FIG. 15C shows an exploded perspective view of the electrical wall plate 500, comprising at least one face plate 102, the PCB 180, the electrical device 10, and the electrical box 3.

FIG. 15D shows a front profile view of the electrical wall plate 500 with the ball and socket camera 143 disposed at the upper left corner of the wall plate 500, although any position on the wall plate 500 may be used. FIG. 15D also shows a section line 15E-15E, along which the view cross-sectional side or profile view of FIG. 15E is taken.

FIGS. 16-18B show various views of different power connectors 160 that may be used with the wall plate 500, instead of the male electrical plug blades 160a, 160b that could also be used the wall plate 500. As indicated above, the POSA will understand that the various power connectors 160, including direct wiring 160c, spring tabs 160d, and USB connector or low voltage connector 160e (shown with respect to wall plate 500 in FIGS. 16-18B) may also be used with any of the other wall plates 100, 200, 300, 400, or variations thereof.

Figure 16:
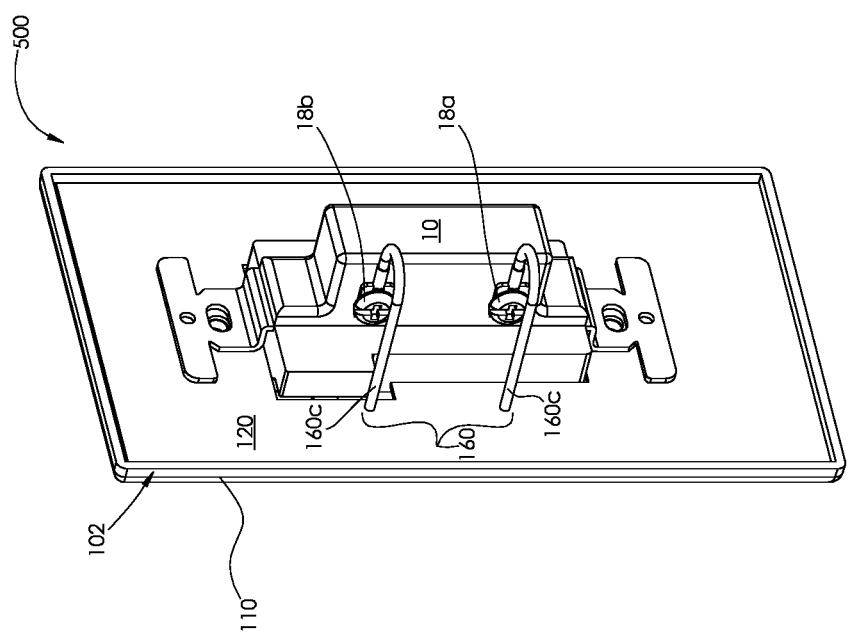
FIG. 16 illustrates a rear perspective view of an embodiment of an electrical wall plate comprising direct wiring for a power connector.

FIG. 16 illustrates a rear perspective view of an embodiment of an electrical wall plate 500 comprising direct wiring 160c that is electrically coupled with the camera or electronic component 140, such as through the PCB or circuit board 180, and may be coupled to the electrical device 10. The direct wiring 160c is coupled with, to, or directly contacts, electrical power transmission conductors 18a and 18b, which may be formed as screws or other suitable structures.

Figure 17:
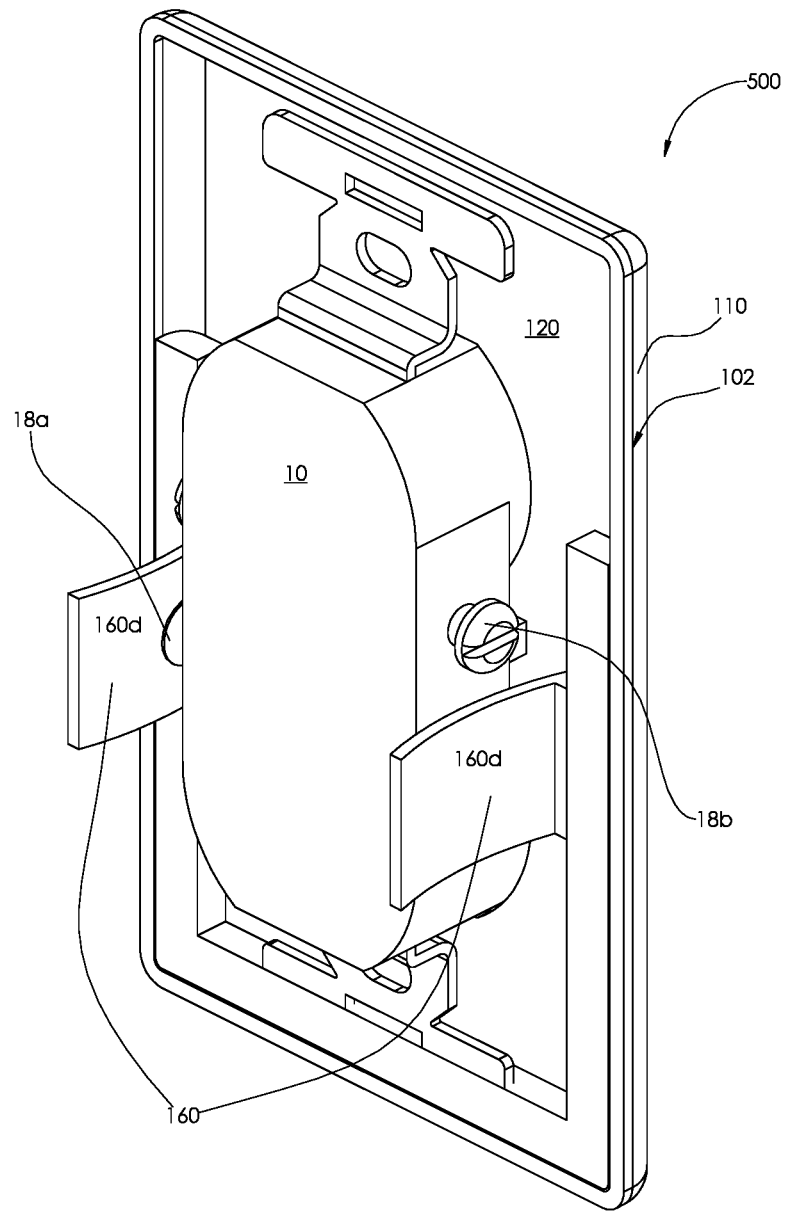
FIG. 17 illustrates a rear perspective view of an embodiment of an electrical wall plate comprising spring tabs for a power connector.

FIG. 17 illustrates a rear perspective view of an embodiment of an electrical wall plate 500 comprising spring tabs 160d for a power connector 160. The spring tabs 160d may be electrically coupled with the camera or electronic component 140, such as through the PCB or circuit board 180, and may be coupled to the electrical device 10. The spring tabs 160d are coupled with, to, or directly contact, electrical power transmission conductors 18a and 18b, which may be formed as screws or other suitable structures.

Figure 18A:
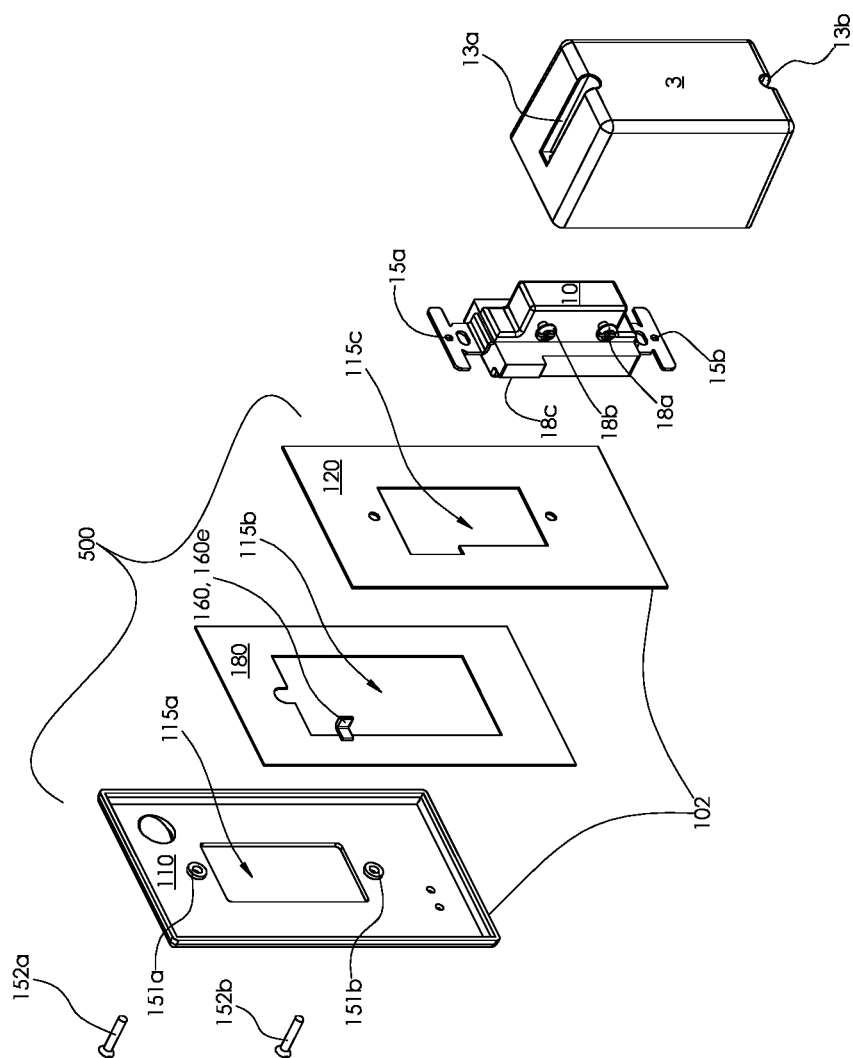

FIGS. 18A and 18B illustrate rear and front exploded perspective views, respectively, of an embodiment of an electrical wall plate 500 comprising USB or low voltage connectors 160e for a power connector 160. FIG. 18A shows an instance in which a portion or first portion of the USB connector 160e, such as a male USB connector, may extend from the PCB 180 in a direction away from the wall plate 500 (similar to male electrical lug blades 160a, 160b). The first portion or male USB connector 160e may be received in, or couple with, a second portion of the USB connection or a USB electrical power transmission receiver or opening 18c formed as part of the electrical device 10. The front perspective view of FIG. 18B provides additional detail of the second portion, female receptacle, or USB electrical power transmission receiver or opening 18c.

While this disclosure has been described in conjunction with the specific embodiments outlined above, it is evident that many alternatives, modifications and variations will be apparent to those skilled in the art. Accordingly, the described and depicted embodiments of the present disclosure as set forth above are intended to be illustrative, not limiting. Various changes may be made without departing from the spirit and scope of the present disclosure, as required by the following claims. The claims provide the scope of the coverage of the present disclosure and should not be limited to the specific examples provided herein.

What is claimed is:

1. An electrical wall plate, comprising:
at least one electrical outlet face plate comprising at least one electrical device opening extending through the face plate, wherein:
the at least one electrical device opening is configured to permit first male electrical plug blades of an electrical power plug to extend through the electrical device opening and engage with a first female receiver of the electrical device, and
the at least one face plate comprises a front face plate and a rear face plate;
at least one box mounting screw opening configured to receive at least one box mounting screw to fasten the face plate to an electrical device;
a power connector comprising second male electrical plug blades extending in a direction away from the face plate and configured to connect with a second female receiver of the electrical device;
a camera integrated within the face plate, exposed through a camera aperture in the face plate, and in electrical connection with the power connector and configured to operate by power obtained from the electrical device when the power connector is connected to the power transmission conductor of the electrical device; and
at least two camera movement control features, wherein:
a first camera movement control feature of the at least two camera movement control features configured to control a first aspect of movement of the camera is accessible within the at least one electrical outlet face plate through a first control feature aperture in a first side surface of the face plate;
a second camera movement control feature of the at least two camera movement control features configured to control a second aspect of movement of the camera different from the first aspect is accessible within the at least one electrical outlet face plate through a second control feature aperture in a second side surface of the face plate non-coplanar with the first side surface;
wherein the first side surface and the second side surface are adjacent to each other; and
wherein each of the at least two camera movement control features are separately configured to movably position the camera or a camera lens by pan or tilt to point in different directions by directly applied mechanical force or indirectly through an electrical signal to servo motors.

2. The electrical wall plate of claim 1, wherein the first control feature aperture and the second control feature aperture are pin-holes.

3. The electrical wall plate of claim 1, wherein the camera or camera lens includes a zoom functionality configured to modify the range of the field of view.

4. The electrical wall plate of claim 1, further comprising:
a printed circuit board (PCB) disposed between the front face plate and the rear face plate, the PCB in electrical communication with the camera and the power connector;
memory storage configured to store photographs or video images captured by the camera; and
a transmitter configured to transmit signals corresponding to video or photo images captured by the camera to a wireless local area network (WLAN) receiver or a wireless personal area network (WPAN) receiver.

5. The electrical wall plate of claim 1, further comprising an external memory port on the electrical wall plate configured to receive and communicate with a removable external memory device.

6. An electrical wall plate, comprising:
a face plate comprising at least one electrical device opening extending through the face plate;
at least one box mounting screw opening configured to receive at least one box mounting screw to fasten the face plate to an electrical device;
a power connector extending in a direction away from the face plate and configured to connect with the electrical device;
a camera integrated with the face plate, exposed through a camera aperture in the face plate, and in electrical connection with the power connector and configured to operate by power obtained from the electrical device when the power connector is connected to the electrical device; and
at least two camera movement control features, wherein:
a first camera movement control feature of the at least two camera movement control features is accessible through a first control feature aperture in a first side of the face plate;
a second camera movement control feature of the at least two camera movement control features is accessible through a second control feature aperture in a second side surface of the face plate;
wherein the first side surface and the second side surface are adjacent to each other; and
wherein the at least two camera movement control features are configured to movably position the camera or a camera lens by pan or tilt to point in different directions.

7. The electrical wall plate of claim 6, wherein the first control feature aperture and the second control feature aperture are pin-holes.

8. The electrical wall plate of claim 6, wherein each of the at least two camera movement control features comprises at least one slider mechanism.

9. The electrical wall plate of claim 6, wherein each of the at least two camera movement control features comprises at least one dial mechanism.

10. The electrical wall plate of claim 6, wherein the power connector comprises male electrical plug blades, direct wiring, spring tabs, or a universal serial bus (USB) connector.

11. The electrical wall plate of claim 6, further comprising an external memory port on the electrical wall plate configured to receive and communicate with a removable external memory device.

12. A method of capturing video images from an electrical wall plate, comprising:
providing an electrical wall plate having at least one opening extending through the electrical wall plate, wherein the electrical wall plate further includes a power connector, a printed circuit board in electrical connection with the power connector, and a video camera integrated within the electrical wall plate, exposed through a camera aperture in the wall plate, and in electrical connection with the printed circuit board;

accessing a first camera movement control feature to manipulate a first aspect of movement of the video camera through a first control feature aperture in a first side surface of the wall plate;

accessing a second camera movement control feature to manipulate a second aspect of movement of the video camera, different from the first aspect of movement, through a second control feature aperture in a second side surface of the wall plate adjacent to and non-coplanar with the first side surface;

movably positioning the camera with the first camera movement control feature and the second camera movement control feature to point the camera in a desired direction;

powering the camera with electricity obtained through an electrical connection between the power connector and an electrical device; and capturing video images by the camera.

13. The method of claim 12, further comprising storing the captured video images in a memory storage device electrically connected to the printed circuit board of the electrical wall plate.

14. The method of claim 12, further comprising transmitting the video images via a transmitter electrically connected to the printed circuit board of the electrical wall plate, wherein the transmitter transmits signals to a wireless local area network (WLAN) receiver or a wireless personal area network (WPAN) receiver.

15. The method of claim 12, further comprising a button switch on the electrical wall plate configured to facilitate pairing of the transmitter with a wireless receiver.

16. The method of claim 12, wherein the electrical device further comprises an electrical receptacle or a light switch.

17. The method of claim 12, wherein the power connector comprises male electrical plug blades, direct wiring, spring tabs, or a universal serial bus (USB) connector.

18. The method of claim 12, further comprising:

accessing a second camera movement control feature through a second control feature aperture in a second side surface of the wall plate adjacent the first side surface of the wall plate; and movably positioning the camera with the second camera movement control feature.

* * * * *